US009611153B2

(12) United States Patent
Dankovich

(10) Patent No.: US 9,611,153 B2
(45) Date of Patent: Apr. 4, 2017

(54) COMPOSITIONS AND METHODS FOR PREPARING COPPER-CONTAINING PAPER AND USES THEREOF

(71) Applicant: University of Virginia Patent Foundation, Charlottesville, VA (US)

(72) Inventor: Theresa A. Dankovich, Pittsburgh, PA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 126 days.

(21) Appl. No.: 14/719,711

(22) Filed: May 22, 2015

(65) Prior Publication Data

US 2015/0336804 A1 Nov. 26, 2015

Related U.S. Application Data

(60) Provisional application No. 62/001,682, filed on May 22, 2014.

(51) Int. Cl.
| | | |
|---|---|---|
| B01D 27/04 | (2006.01) |
| C02F 1/28 | (2006.01) |
| C02F 1/50 | (2006.01) |
| C08B 15/05 | (2006.01) |
| C02F 1/00 | (2006.01) |

(52) U.S. Cl.
CPC .............. *C02F 1/002* (2013.01); *B01D 27/04* (2013.01); *C02F 1/288* (2013.01); *C08B 15/05* (2013.01); *C02F 1/50* (2013.01)

(58) Field of Classification Search
CPC . C02F 1/002; C02F 1/288; C02F 1/50; B01D 27/04; C08B 15/05
See application file for complete search history.

(56) References Cited

U.S. PATENT DOCUMENTS

| | | | | |
|---|---|---|---|---|
| 2009/0099541 | A1* | 4/2009 | Qin ....................... | A61F 13/53 604/376 |
| 2013/0319931 | A1* | 12/2013 | Liu ......................... | C02F 1/50 210/488 |
| 2014/0374327 | A1 | 12/2014 | Langdo et al. | |

OTHER PUBLICATIONS

Clasen, T., Household Water Treatment and the Millenium Development Goals: Keeping the Focus on Health. Environ. Sci. Technol., 2010, 44(19), pp. 7357-7360.
(Continued)

*Primary Examiner* — Lucas Stelling
(74) *Attorney, Agent, or Firm* — Rodney L. Sparks

(57) ABSTRACT

The invention comprises an environmentally benign method for the direct in situ preparation of copper nanoparticles (CuNPs) in paper by reducing sorbed copper ions with ascorbic acid. Copper nanoparticles were quickly formed in less than 10 minutes and were well distributed on the paper fiber surfaces. Paper sheets were characterized by x-ray diffraction, scanning electron microscopy, energy dispersive x-ray spectroscopy, and atomic absorption spectroscopy. Antibacterial activity of the CuNP sheets was assessed for by passing *Escherichia coli* bacteria suspensions through the papers. The effluent was analyzed for viable bacteria and copper release. The CuNP papers with higher copper content showed a high bacteria reduction of log 8.8 for *E. coli*. The paper sheets containing copper nanoparticles were effective in inactivating the test bacteria as they passed through the paper. The copper levels released in the effluent water were below the recommended limit for copper in drinking water (1 ppm).

36 Claims, 16 Drawing Sheets

(56) References Cited

OTHER PUBLICATIONS

Esperito Santo, C., et al., "Bacterial Killing by Dry Metallic Copper Surfaces", Appl. Environ. Micribol., 2011, 77(3), pp. 794-802.
Molenti, C., et al., "Killing of Bacteria by Copper Surfaces Involves Dissolved Copper", Appl. Environ. Microbiol., 2010, 76(12), pp. 4099-4101.
Ogawa, Y, et al., "Formation and stability of cellulose-copper-NaOH crystalline complex", Cellulose, 2013, DOI:10.1007/s10570-013-9977-4.
Sudha, V.B.P., et al., "Storing drinking-water in copper pots kills contaminating diarrhoeagenic bacteria", J. Health Popul. Nutr., 2012, 30(1), pp. 17-21.
Varkey, A.J., et al., "Point-of-use water purification using clay pot water filters and copper mesh", Water SA, 2012, 38(5), pp. 721-726.

\* cited by examiner

COMPOSITIONS AND METHODS FOR PREPARING COPPER-CONTAINING PAPER AND USES THEREOF

CROSS REFERENCE TO RELATED APPLICATIONS

This application is entitled to priority pursuant to 35 U.S.C. §119(e) to U.S. provisional patent application No. 62/001,682, filed on May 22, 2014. The entire disclosure of the afore-mentioned patent application is incorporated herein by reference.

STATEMENT REGARDING FEDERALLY SPONSORED RESEARCH OR DEVELOPMENT

This invention was made with government support under Grant No. D43TW009359 awarded by the Fogarty International Center of The National Institutes of Health. The government has certain rights in the invention.

BACKGROUND

The lack of clean drinking water in many rural communities throughout the world is a significant human-health concern. Point-of-use (POU) water purification offers an affordable and convenient way to reduce exposure to pathogenic microorganisms (Clasen, 2010). Paper-based filters coated with biocidal agents are easy to produce and distribute to remote locations. Filters containing nanoparticles do not require energy inputs for water purification. Paper and cotton fabrics are very abundant and regularly used in water filtration. Recently, for POU applications, we have designed a paper sheet embedded with silver nanoparticles to purify drinking water contaminated with bacteria (Dankovich and Gray, 2011a). As a more affordable alternative to silver, researchers have turned to using copper to purify drinking water (Sudha et al, 2012; Stout and Yu, 2003; Varkey and Dlamini, 2012).

Copper and copper compounds have been demonstrated to eliminate a wide variety of microorganisms, including *Vibrio cholerae, Shigella, E. coli, Salmonella*, fungi, viruses, and other types (Sudha et al, 2012; Esperito Santo et al, 2011; Molteni et al, 2010). Metallic copper surfaces have been used to prevent bacterial growth in hospitals (Esperito Santo et al, 2011; Molteni et al, 2010). Copper nanoparticles can be incorporated into fibrous materials to act as a long-lasting reservoir of copper ions for enhancing antimicrobial and catalytic activity (Vainio et al, 2007; Bendi and Imae, 2013; Ben-Sasson et al, 2013). Recently, researchers have demonstrated the application of copper nanoparticles to cellulosic materials (Vainio et al, 2007; Bendi and Imae, 2013; Jia et al, 2012; Cady et al, 2011). However, none of these researchers have evaluated these copper nanoparticle membranes as antibacterial drinking water purifiers. A similar membrane technology is a membrane containing copper oxide particles for virus removal from breast milk (Borkow et al, 2007). Recently, a related application using a porous ceramic substrate doped with copper nanoparticles as a filter material showed strong bactericidal activity (Klein et al, 2013).

There is a long felt need in the art for compositions and methods useful for making filters that can be used to purify or decontaminate water. The present invention satisfies these needs.

SUMMARY OF THE INVENTION

Inadequately treated water may contain disease-causing organisms, or pathogens, including various types of bacteria, viruses, protozoan parasites, and other organisms. The present application discloses a novel and facile method for embedding copper nanoparticles in cellulosic papers useful as a point-of-use water purification and disinfectant system that is cheap, and easily made and used. This involves the preparation of copper nanoparticles in situ on the fiber surfaces with a mild reducing agent and a heat source. In one aspect, the reducing agent is ascorbic acid. These papers are useful as antimicrobials based, in one aspect, on their ability to release copper, which has antimicrobial activity.

In one embodiment, the present invention provides a method of preparing a point-of-use water purification system comprising copper-containing paper. In one aspect, the method comprises contacting an absorbent cellulose blotting paper or a filter paper with an alkaline solution of copper hydroxide and soaking the paper in the solution, wherein copper is sorbed onto the paper. The paper is removed from the copper hydroxide solution and then contacted with deionized water to remove excess base. Following removing the excess base, copper ions embedded in the paper are reduced by contacting the paper with an ascorbic acid solution. The paper is then removed from the ascorbic acid solution and washed with deionized water.

In one aspect, the paper is blotting paper. In one aspect, the paper of the invention is filter paper.

The present invention further provides copper-containing paper made by the methods of the invention. The present invention further provides a point-of-use water purification system using a filter made by the methods of the invention. The present invention further provides a method of purifying water using the system provided herein.

The system of the invention is further useful for purifying air by removing or killing microorganisms by contacting with a copper-containing paper of the invention.

Various aspects and embodiments of the invention are described in further detail below.

DETAILED DESCRIPTION

Figures 1A, 1B, 1C:
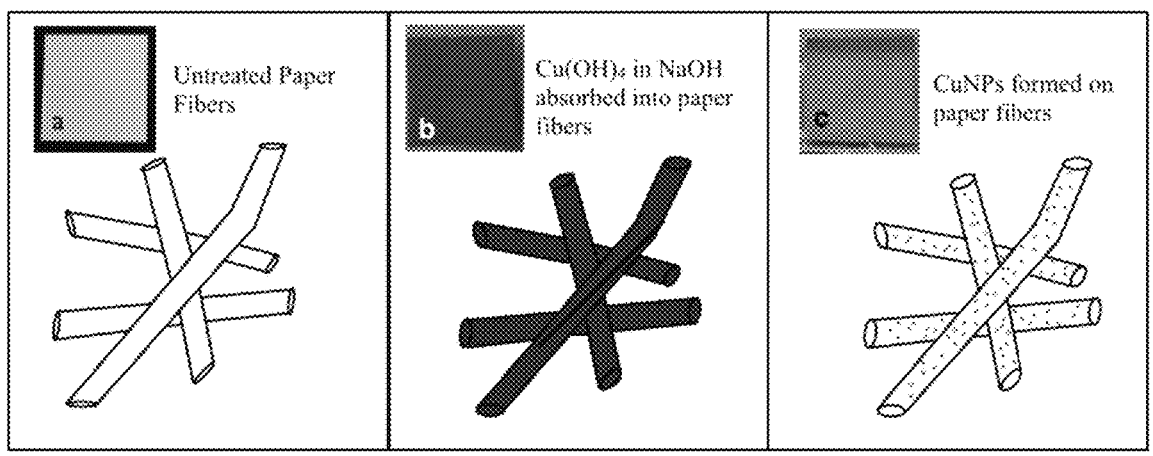
FIG. 1. Blotter papers (a) untreated, (b) soaked in cuprate solution for 2 days (alkali-cellulose II(Cu)), and (c) alkali-cellulose II(Cu) heated in the 10% w/v ascorbic acid bath (85° C.) for 10 minutes.

Abbreviations and Acronyms
CFU—colony forming unit
CuNP—copper nanoparticle
*E. coli*—*Escherichia coli*
EDX—energy-dispersive X-ray spectroscopy
EPA—Environmental Protection Agency
FAA—flame atomic absorption
g—gram
GF-AA—graphite furnace atomic absorption
L—liter
mL—milliliter
mm—millimeter
POU—point-of-use
ppb—parts per billion
ppm—parts per million
XRD—x-ray diffraction
Definitions In describing and claiming the invention, the following terminology will be used in accordance with the definitions set forth below.

The articles "a" and "an" are used herein to refer to one or to more than one (i.e., to at least one) of the grammatical object of the article. By way of example, "an element" means one element or more than one element.

The term "about," as used herein, means approximately, in the region of, roughly, or around. When the term "about" is used in conjunction with a numerical range, it modifies that range by extending the boundaries above and below the numerical values set forth. For example, in one aspect, the term "about" is used herein to modify a numerical value above and below the stated value by a variance of 20%. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. Numerical ranges recited herein by endpoints include all numbers and fractions subsumed within that range (e.g., 1 to 5 includes 1, 1.5, 2, 2.75, 3, 3.90, 4, and 5). The upper and lower limits of these smaller ranges may independently be included in the smaller ranges and are encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about". The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

The term "amebiasis", as used herein, refers to the disease caused by *E. histolytica*. The term "amebiasis" is used interchangeably with the term "amoebiasis". The symptoms often are quite mild and can include loose stools, stomach pain, and stomach cramping. Amebic dysentery is a severe form of amebiasis associated with stomach pain, bloody stools, and fever. Rarely, *E. histolytica* invades the liver and forms an abscess. Even less commonly, it spreads to other parts of the body, such as the lungs or brain.

The terms "antimicrobial" or "antimicrobial activity" as used herein refer to a process or activity that has an antimicrobial effect, either by physical nature or by a chemical nature, including killing microorganisms, inhibiting growth of microorganisms, or removing the microorganisms. The terms "antibacterial", "antifungal", etc. can be considered in the same manner. The activity is also to be considered in light of the context of the specification and claims as written.

The term "antimicrobial agents" as used herein refers to any naturally-occurring, synthetic, or semi-synthetic compound or composition or mixture thereof, which is safe for human or animal use as practiced in the methods of this invention, and is effective in killing or substantially inhibiting the growth of microorganisms. "Antimicrobial" as used herein, includes antibacterial, antifungal, and antiviral agents.

Also provided are methods of disinfecting a water source using the subject materials. Aspects of the invention further include compositions, e.g., materials, water filters, treatment devices and kits, etc., that find use in methods of the invention. Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

As used herein, an "effective amount" means an amount sufficient to produce a selected effect.

As used in the specification and the appended claims, the terms "for example," "for instance," "such as," "including" and the like are meant to introduce examples that further clarify more general subject matter. Unless otherwise specified, these examples are provided only as an aid for understanding the invention, and are not meant to be limiting in any fashion.

The terms "formula" and "structure" are used interchangeably herein.

As used herein, a "functional" molecule is a molecule in a form in which it exhibits a property or activity by which it is characterized. A functional enzyme, for example, is one that exhibits the characteristic catalytic activity by which the enzyme is characterized.

The term "inhibit," as used herein, refers to the ability of a compound of the invention to reduce or impede a described function, such as, for example, having activity against cell proliferation or activity against an enzyme. Preferably, inhibition is by at least 10%, more preferably by at least 25%, even more preferably by at least 50%, and most preferably, the function is inhibited by at least 75%. The terms "inhibit", "reduce", and "block" are used interchangeably herein.

As used herein, an "instructional material" includes a publication, a recording, a diagram, or any other medium of expression which can be used to communicate the usefulness of the peptide of the invention in the kit for effecting alleviation of the various diseases or disorders recited herein. Optionally, or alternately, the instructional material may describe one or more methods of alleviating the diseases or disorders in a cell or a tissue of a mammal. The instructional material of the kit of the invention may, for example, be affixed to a container which contains the identified compound invention or be shipped together with a container which contains the identified compound. Alternatively, the instructional material may be shipped separately from the container with the intention that the instructional material and the compound be used cooperatively by the recipient.

A "point-of-use water purification system for inactivating bacteria", as used herein, refers to a cellulose paper that has been impregnated with copper and through which water can be filtered. The paper can be a blotting or filter paper.

By the term "on the paper", when referring to "sorbed copper forms copper nanoparticles on the paper", is meant that the nanoparticles are formed on the paper fibers (see FIGS. 1 and 3).

Embodiments

The present invention provides methods for preparing and using a point-of-use water purification system that is cheap and efficient and is effective against microorganisms. The system is based on incorporation of copper into blotting papers and the copper, which is antimicrobial, is released into the water when the water is filtered through it.

In one embodiment, the present invention provides a cost-effective alternative to silver nanoparticles for point-of-use water purification. In one aspect, the present invention provides for the use of copper nanoparticles instead of silver.

To test for the bactericidal effectiveness of copper nanoparticle (CuNP) paper of the invention, *E. coli* bacterial suspensions were passed through a CuNP paper sheet, and the effluent water analyzed for viable bacteria following passage through the paper (see Examples). The paper was selected because the particle retention size is greater than the size of bacteria, which allows for exposure to copper nanoparticles, not removal of the bacteria due to filtration removal (Dankovich and Gray, 2011a). Therefore, in one aspect, the particle retention size of the cellulose paper of the invention can be larger than the microorganisms or bacteria that contaminate water or they can be smaller, such that they are also filtered by size exclusion.

One of skill in the art will appreciate that other paper/filters can also be used in the methods of the invention and that other metal nanoparticles can be prepared, wherein the nanoparticles used have the same properties and activity as the copper nanoparticles disclosed herein and that combinations of copper and other metals can be used as well.

One of skill in the art will appreciate that other paper/filters can also be used in the methods of the invention and that other copper metal nanoparticles can be prepared, wherein the nanoparticles used have the same properties and activity as the copper nanoparticles disclosed herein and that combinations of copper and other copper salts can be used as well.

In one aspect, the copper nanoparticles of the invention have antimicrobial activity. In one aspect, they are antibacterial.

In one aspect, the compositions, systems, and methods of the invention are useful against, for example, coliform bacteria, *Vibrio cholerae, Shigella, E. coli, Salmonella*, fungi, and viruses.

In one embodiment, methods are provided for preparing a point-of-use water purification system using a blotting or filter paper that is treated such that it comprises copper. The method of preparation encompasses contacting an absorbent cellulose blotting paper with an alkaline solution of copper hydroxide and then soaking the paper in the solution. Copper is sorbed onto the paper. The paper can be soaked in the copper solution for varying amounts of time. One of ordinary skill in the art can vary the time based on conditions such as the amount of copper in the solution, the thickness of the paper, the size of the paper, the volume of the solution relative to the size of the paper, etc. The times can range from, for example, from about 5 minutes to about 5 days, or about 10 minutes to about 3 days, or about 30 minutes to about 48 hours, or about 1 hour to about 24 hours, as well as any intervals and fractions therein. Then, the paper is removed from the copper hydroxide solution and contacted or rinsed with deionized water to remove excess base. Following removing the excess base, the copper ions embedded in the paper are reduced by saturating the paper with an ascorbic acid solution. The paper is then washed/removed from the ascorbic acid solution and rinsed with deionized water. The present invention provides preparation and solutions useful for preparation of the point-of-use water purification system. For example, in one aspect, the alkaline copper hydroxide solution is prepared by adding 1 M NaOH to a 0.32 M $CuSO_4$ solution to form gelatinous copper hydroxide ($Cu(OH)_2$) and dissolving the gelatinous $Cu(OH)_2$ in 500 ml of 10 M NaOH to form $[Cu(OH)_4]^{2-}$. In one aspect, the ascorbic acid solution is a 10% ascorbic acid solution. One of ordinary skill in the art will appreciate that the ascorbic acid concentration can be varied from about 1% to 100%. In one aspect, the paper is contacted with the ascorbic acid solution at about 85° C. for about 10 to about 30 minutes. One of ordinary skill in the art will appreciate that instead of the $CuSO_4$ solution, a CuCl or other copper salt solution can be used.

In one aspect, the paper used is made using the kraft process or is another variety of paper pulp or cotton linters or other cellulosic material.

In one embodiment, the material used to make the paper is a polymer. In one aspect, the polymer is cellulose.

Various papers with filtering capability can be used. In one aspect, the paper is cellulosic. The size of the paper can vary. It can be prepared to be larger than the filtering apparatus in which it is to be placed and it can be trimmed to the proper size. In one aspect, it is blotting paper.

The thickness of the paper can vary. In one aspect, it is about 0.05 mm thick to about 10 mm thick. In one aspect, is it about 0.1 mm to about 5 mm thick or about 0.1 mm to about 3.0 mm thick. In one aspect, it is about 0.1, 0.2, 0.3, 0.4, 0.5, 0.6, 0.7, 0.8, 0.9, or 1.0 mm thick.

The amount of copper sorbed to paper can vary and can be manipulated by varying the conditions of preparation, such as amount of time that the copper solution is in contact with the paper, the concentration of copper in the solution, etc. In one aspect, once the paper has been prepared, it comprises a range of about 1 mg sorbed Cu/g paper to about 500 mg sorbed Cu/g paper, or about 5 to 250, or about 10 to 100, or about 15 to 65 mg sorbed Cu/g paper, including all whole integers, decimals, and fractions thereof. In one aspect, it is about 65 mg. In one aspect, the copper forms copper nanoparticles.

In one embodiment, the amount of sorbed copper in a blotting or filter paper described herein ranges from about 0.5 to about 10 weight percent. In one aspect, it ranges from about 1.0 to about 8 weight percent. In one aspect, it ranges from about 2.0 to about 7.0 weight percent. In one aspect, amount of sorbed copper described herein is about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or about 10.0.

In one aspect, copper nanoparticles begin forming in less than about 10 minutes. In another aspect, copper nanoparticles begin forming in less than about 1 hour. In another aspect, copper nanoparticles begin forming in less than about 5 hours, or 10 hours, or 24 hours, or about 48 hours.

One of ordinary skill in the art will appreciate that the grammage can vary and that paper can be chosen based on the grammage. For example, paper can comprise a grammage range from about 10 to about 1,000 g/m$^2$. In one aspect, it can comprise a grammage range from about 30 to about 440 g/m$^2$. In one aspect, the range is from about 50 to about 400, or about 100 to about 300, or about 150 to about 250. In one aspect, it is about 265.

Once the copper-containing blotting paper has been prepared for use as a point-of-use water purification system and washed in deionized water, it can be stored for use. In one aspect, it is dried before storage.

In some embodiments, the metal used is copper. In one aspect, other copper containing compounds and nanomaterials such as cupric or cuprous oxide nanoparticles can be used. In one aspect, metal nanoparticles are formed.

In other embodiments, other metals such as arsenic, cadmium, gold, iron, mercury, silver, or zinc could be used in combination with copper. In one aspect, more than one metal can be used. In one aspect, metal nanoparticles are formed. Any convenient metals may be utilized. Metals of interest include, but are not limited to, metals having one or more beneficial properties of interest when dissolved in water, such as bactericide properties, disinfectant properties, reducing properties, and the like.

In certain embodiments, the filter disinfects water that passes through the filter. In certain embodiments, the filter disinfects water that has been contacted with or incubated with a filter of the invention. Although the term "filter" is used to describe the final copper nanoparticle-containing paper of the invention and it can be used by filtering water through it to release copper, it can also be used by placing the filter in the water.

Any convenient contaminated water sources may be utilized in the subject methods. In some embodiments, the volume of water disinfected is of about 1 L or more, such as about 2 L, about 3 L, about 4 L, about 5 L, about 6 L, about 7 L, about 8 L, about 9 L, about 10 L, about 15 L, about 20 L, about 50 L, or even more. In some cases, the water is uncontaminated. In other cases, the water is contaminated with one or more types of bacteria or pathogenic microorganisms.

When a sample of water is being purified or disinfected by filtering through a POU of the invention, the flow rate can be varied based on various parameters such as the size of the filter, the amount of sediment or contamination perceived to be in the water, the size of the vessel holding the paper, etc. For example, the flow rate can vary from about 0.1 to about 100 L/hr. In one aspect, the rate varies from about 0.5 to about 50 L/hr. In one aspect, the flow rated varies from about 1.0 to about 2.0 L/hr. In one aspect, the flow rate is about 1.81 L/hr.

In some embodiments, the copper-nanoparticle containing filter paper comprises sufficient metal to provide for continuous disinfection of influent water over a period of from about 4 hours to about 1 week, such as from about 6 hours to about 3 days week, about 8 hours to about 2 days. In one aspect, the water is gravity fed. In one aspect, the water is pumped.

In some embodiments, the copper-containing paper is used as a filter so that water can be passed through it. One of ordinary skill in the art can make or obtain the size of paper needed for a particular application, based on factors such as the volume of water to be treated, whether it is to be filtered through the filter, or the type of holder apparatus in the which the filtering is to take place.

The number of copper nanoparticles or copper metal released from a POU system of the invention will vary depending on factors such as the initial amount of copper in the paper, the flow rate through it, the size of the pores in the paper, the amount of contaminating microorganisms, dirt, etc. in the water. In one aspect, the copper released is less than about 100 parts per million, or 50 parts per million, or 25 parts per million, or about 5 parts per million. In another aspect, it is less than about 2, 1, 0.5, or 0.2 parts per million The materials, devices, kits and methods of the invention, e.g., as described herein, find use in a variety of applications. Applications of interest include, but are not limited to, research applications and water treatment applications. Methods of the invention find use in a variety of different applications including any convenient application where the treatment of water is of interest.

A bactericidal concentration is a concentration effective at reducing or eliminating bacteria in water. The bactericidal concentration may be further maintained at a level safe for human consumption.

In certain embodiments, the method of water purification for use as an antimicrobial comprises contacting the water source with a POU filter of the invention by adding it to a filter holder above a collection vessel and passing water through the filter. In some instances, water source is filtered through the filter/POU. The POU filter releases copper into water with which it comes in contact, thereby disinfecting the water. In one aspect, copper is released from the filter into the water at a rate sufficient to maintain an antimicrobial concentration of copper in the water. This bactericidal concentration of copper may be maintained at a level that is safe for human consumption.

The subject methods may be used to remove a variety of bacteria and pathogenic microorganisms from a water source. The subject methods may be used to remove, kill, or inactivate a variety of bacteria and pathogenic microorganisms from a water source where copper is effective against the microbe. In some embodiments, the bacteria are *E. coli, Shigella,* or *Vibrio cholerae.* Other waterborne pathogens of interest include, but are not limited to, norovirus, rotavirus, the protozoans *Cryptosporidium parvum, Giardia lamblia,* and *Entamoeba histolytica.*

The subject materials and methods find use in a variety of water treatment applications. Water treatment applications of interest include those applications in which the consumption of safe drinking water and point of use water treatment is of interest. As such, the subject materials, devices, and methods find use in treatment of unsafe water from sources that include, for example, bacteria. In some instances, the compounds and methods are used to disinfect a source of water at a point of use.

In some embodiments, the compositions of the invention may be used in a water treatment device which may include an open top. In certain cases, the open top is utilized as a port. In certain embodiments, the water treatment device may be enclosed such that the chamber may be sealed, pressurized, and/or environment controlled, etc. An apparatus for water filtration may also include a base, a filtration receptacle coupled to the base, and a container that removably coupled to the base. The filtration apparatus includes a water inlet and a water outlet. The filtration apparatus includes a site for a filter to be positioned between the water inlet and the water outlet. Useful apparatuses may be found in Langdo et al., (PCT/US2012/069852, filed Dec. 14, 2012) and in Smith et al. (Int. Pat. Pub. No. WO 2014/071346; published May 8, 2014).

One of ordinary skill in the art will appreciate that additional embodiments of the copper treated papers include non-point of use water disinfection applications with appropriate modifications to paper thickness, size, copper concentrations, and provision for serial or parallel water flow through filter papers to allow required copper-bacterial contact times to achieve anti-microbial technical parameters.

The size of the copper nanoparticles of the invention range from about 50 nm to about 1000 nm in diameter. In one aspect, they range in size from about 100 nm to about 600 nm in diameter. In one aspect, the particles have an average diameter of about 274.2 nm.

In one embodiment, water treated with the POU of the invention has a reduction in the number microorganisms in the water. In one embodiment, water treated with the POU of the invention has a reduction in the number of viable microorganisms in the water. In one aspect, the microorganisms are bacteria. In one aspect, the reduction in microorganisms ranges from about a 1 log reduction to about a 10 log reduction in number. In one aspect, the reduction is about 1, 2.5, 3.5, 4.7, 5, 8.8, or 10.

Turbidity refers to cloudiness of water. Turbidity has no health effects, but can interfere with disinfection and provide a medium for microbial growth. Turbidity may indicate the presence of disease-causing organisms, including bacteria, viruses, and parasites that can cause symptoms such as nausea, cramps, diarrhea and associated headaches.

Coliforms are bacteria that are naturally present in the environment and used as an indicator that other, potentially harmful, bacteria may be present. Fecal coliform and *Escherichia coli (E. coli)* are bacteria whose presence indicates that water may be contaminated by human or animal wastes. Microorganisms in these wastes can cause short term effects, such as diarrhea, cramps, nausea, headaches, or other symptoms. They may pose a special health risk for infants, young children, and people with severely compromised immune systems.

Fecal indicators (Enterococci or coliphage) are microorganisms whose presence indicates that water may be contaminated with human or animal wastes. Coliphage are viruses that infect the bacterium *E. coli*. Enterococci are bacterial indicators of fecal contamination. Microorganisms in these wastes can cause short-term health effects, such as diarrhea, cramps, nausea, headaches, or other symptoms. They may pose a special health risk for infants, young children, some of the elderly, and people with severely compromised immune systems.

One of ordinary skill in the art will appreciate that the compositions, methods, and systems of the invention can be used in conjunction with other water filtration systems, including those designed to remove particulates.

The present invention further provides for the use of the copper-containing paper of the invention to be contacted with air for use as an antimicrobial. That is, it can be used as a "point-of-use air purification system" based on it antimicrobial activity.

Aspects of the invention further include kits, where the kits include one or more components employed in methods of the invention, filters, components, reagents, solvents, buffers, copper-containing papers, apparatuses for holding the papers, etc., as described herein. In some embodiments, the subject kit includes one or more components of the subject mixture (e.g., as described herein), and one or more additional components. In one embodiment, the kit includes a book comprising pages made of the copper-containing papers of the invention. Any of the components described herein may be provided in the kits. A variety of components suitable for use in making and using the subject materials and devices may find use in the subject kits.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order that is logically possible.

Examples

Materials and Methods

Absorbent blotting papers made from bleached softwood kraft pulp were used (made by Domtar Inc. and supplied by FP Innovations, Pointe-Claire, QC). The sheet thickness and grammage are 0.5 mm and 250 g/m$^2$, respectively. Copper sulfate ($CuSO_4$), ascorbic acid ($C_6H_8O_6$), 30% hydrogen peroxide ($H_2O_2$), concentrated sulfuric acid ($H_2SO_4$), dipotassium phosphate ($K_2HPO_4$), monopotassium phosphate ($KH_2PO_4$), tryptone, yeast extract, and sodium chloride were purchased from Fisher Scientific and used as received. Colilert® Quanti-Trays 2000 were purchased from IDEXX Laboratories, Westbrook, Me. Water treated with a Barnstead Nanopure system was used throughout.

Preparation of Copper Nanoparticle Paper

We immersed sheets of blotting paper (10 cm by 10 cm) in freshly prepared alkaline solutions of copper hydroxide (0.8%) for 1 hour to 2 days. Alkaline copper hydroxide solution was prepared by adding 1 M NaOH to 0.32 M $CuSO_4$ solution to form gelatinous copper hydroxide ($Cu(OH)_2$), and subsequently, $Cu(OH)_2$ was dissolved in 500 mL of 10 M NaOH to form $[Cu(OH)_4]^{2-}$, which typically was 30 mM $[Cu(OH)_4]^{2-}$. Following copper absorption by the blotting papers, they were soaked in deionized water to remove excess base. To reduce the copper ions embedded in the paper fibers, the blotting papers were placed in a 10% ascorbic acid aqueous bath at 85° C. for 10-30 minutes. Following reduction, the papers were soaked overnight in deionized water.

Characterization

Paper samples were imaged through standard photography and dark field microscopy (Hirox KH 7700). Qualitatively, color changes from white to red and/or maroon indicate the presence of copper nanoparticles (Jia et al., 2012). Additionally, the presence of CuNPs in the blotting paper was confirmed by x-ray diffraction (XRD) using PANalytical X'Pert Pro Multi Purpose Diffractometer (PANalytical B.V., The Netherlands). Paper samples were finely ground to a powder with a coffee grinder prior to XRD analysis.

The shape and size distribution of the copper nanoparticles in the sheet were examined by electron microscopy. Imaging and analysis of the CuNP paper was performed with a field emission scanning electron microscopy (Hitachi S-4700 FE-SEM) attached to an energy-dispersive X-ray spectroscopy detector (EDX). For SEM, samples were sputter coated with a thin, 12 nm, layer of AuPd prior to imaging. Nanoparticle diameters were measured for greater than 150 particles.

To quantify the amount of copper in the CuNP papers, we performed an acid digestion of the paper and analyzed the amount of dissolved copper with a flame atomic absorption (FAA) spectrometer (Perkin Elmer AAnalyst 200). To dissolve the copper and to degrade the cellulose fibers, ~0.05 grams of CuNP paper was added to 2 mL concentrated sulfuric acid heated in a sand bath to between 50° C. and 60° C. and was followed by the addition of 2 mL 30% hydrogen peroxide. The copper content is reported for four replicates per sample concentration with standard error reported.

Bactericidal Activity

The bactericidal activity of the CuNP paper was tested against a nonpathogenic wild strain of *Escherichia coli*, a model organism for contaminated water, which was obtained from IDEXX (IDEXX Laboratories, Inc, Maine). The influent consisted of a 100 mL bacteria suspension in a 10 mM random motility buffer solution (0.4949 g/L of $K_2HPO_4$ and 0.212 g/L of $KH_2PO_4$) with either $5\times10^4$ or $4\times10^9$ colony-forming units (CFU)/mL of *E. coli*. This bacterial suspension was passed through a 6.5 cm by 6.5 cm sheet of CuNP paper, as described previously (Dankovich and Gray, 2011a). As a control paper, we also filtered *E. coli* through an untreated paper sheet. Prior to pouring the bacterial suspension through the paper filters, the filters were rinsed with 20-50 mLs of deionized water to check for a water-tight seal in the filter holder. The effluent water was tested for live bacteria by shaking 100 mL of effluent water with an IDEXX Colilert® pack and subsequent sealing in IDEXX Quanti-Tray 2000. The Quanti-trays were incubated overnight at 37° C. for 24 h and the positive wells were counted (Edberg et al, 1990). Seven samples tested were evaluated at each influent bacteria concentration with standard error reported.

Copper Release and Retention

The effluent was analyzed for copper by graphite furnace atomic absorption spectrometry (GF-AA, Perkin Elmer AAnalyst 200 with HGA 900). The copper release was evaluated from 0.1 to 2 L of deionized water for six samples with standard error reported. The percent copper retention was determined from the copper release subtracted from the overall copper content of the paper.

Results and Discussion

Paper Characterization

In order to sorb copper ions on the surface of cellulose paper fibers, we evaluated a range of dissolved copper compounds to determine which conditions showed the greatest copper absorption. We found that a high pH of the dissolved copper solution was a pertinent factor for copper sorption, as observed previously (Davidson and Spedding, 1958). Optimal copper absorption into the cellulose fibers occurred from concentrated sodium hydroxide with dissolved cupric hydroxide (cuprate), and took several hours for papers to become saturated with copper ions (abbreviated to alkali-cellulose II(Cu)). Following copper uptake from these cuprate solutions, the copper nanoparticles were readily formed on the cellulosic blotter papers via a reduction with ascorbic acid dissolved in a hot aqueous bath (85° C.). (FIG. 1).

Figure 2:
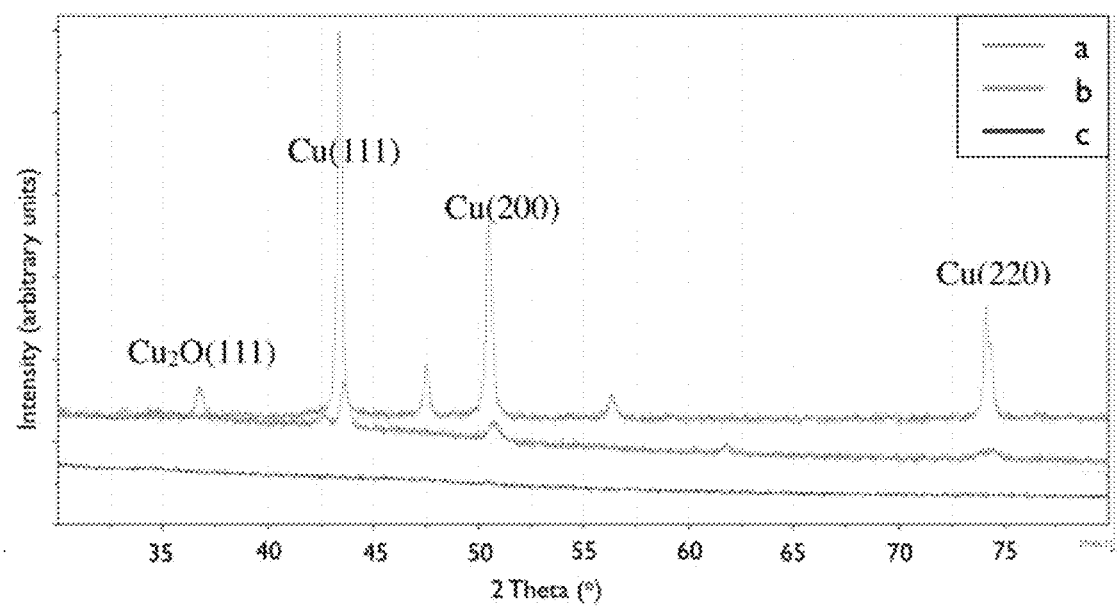
FIG. 2. XRD patterns of (a) copper power produced ascorbic acid reduction, (b) ground CuNP paper, and (c) ground untreated paper.

The x-ray diffraction patterns confirm the formation of copper particles from the ascorbic acid reduction method (FIG. 2). The largest peaks were observed from copper powder formed from ascorbic acid reduction of cuprate in suspension and corresponded to the fcc copper phase ($2\theta=43.3°$, 50.4°, 74.1°, JCPDS 85-1326). Lower peak intensities were observed in the ground CuNP paper samples and most peaks were in the same locations with the additional peak at $2\theta$ at 36.4°, which corresponds to $Cu_2O$ (111) (JCPDS 77-0199). This indicates some minor oxide formation on the copper surface in the air, which is not unexpected, as other researchers have also observed the presence of copper oxides along with CuNPs following CuNP formation on fiber surfaces (Cady et al, 2011; Vainio et al, 2007). No peaks were observed for the untreated paper.

Figure 3A:
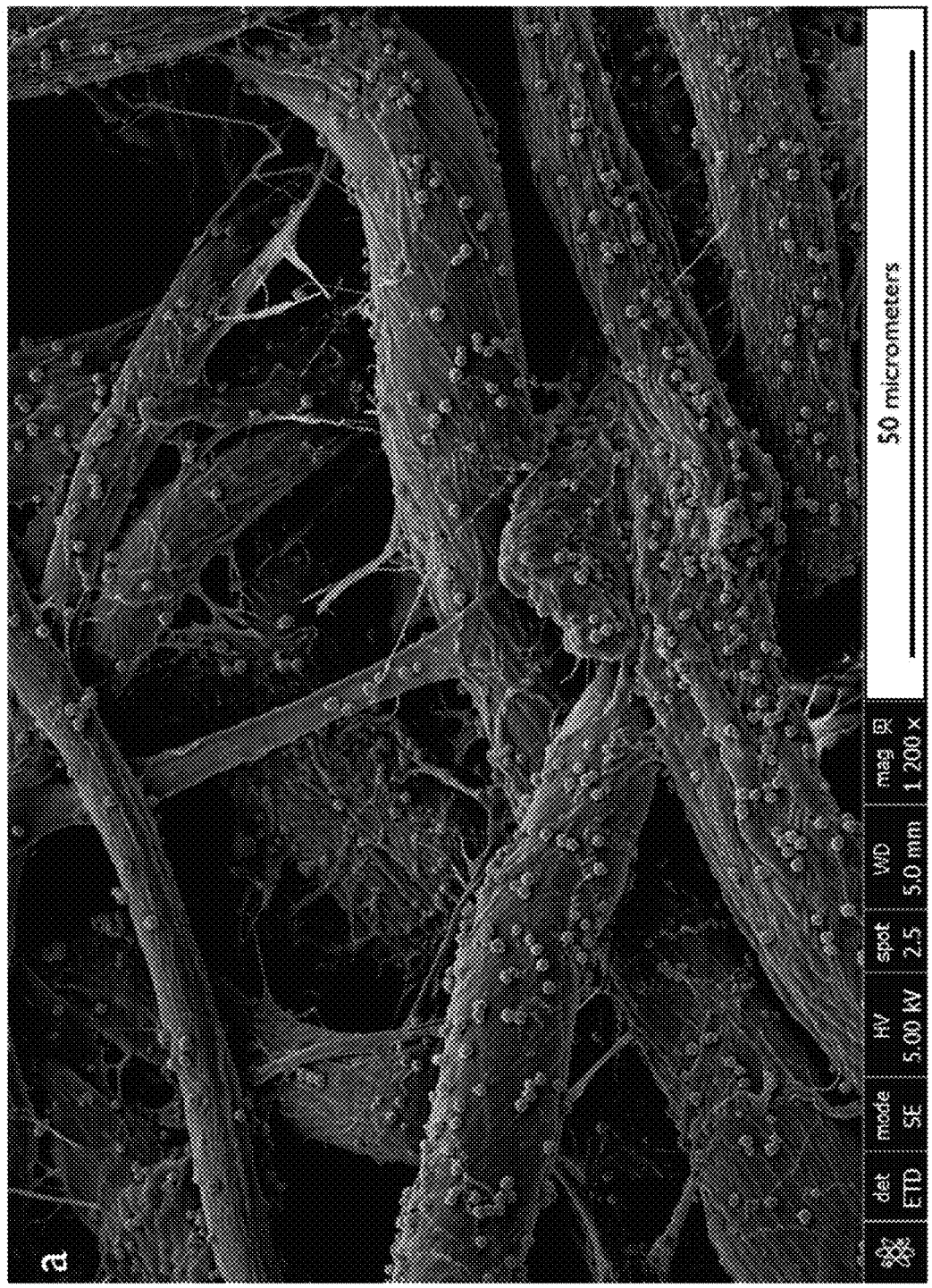
FIG. 3. Characterization of copper Nanoparticles embedded on paper fibers. Scanning electron microscope image of CuNP paper with 65 mg Cu/g paper: (a) 1,200× and (b) 10,000× magnification. (c) Histogram of distribution of copper nanoparticle diameters, as measured from SEM images. (d) EDX spectra of CuNP papers. Samples were sputter coated with Au Pd.
Figure 3B:
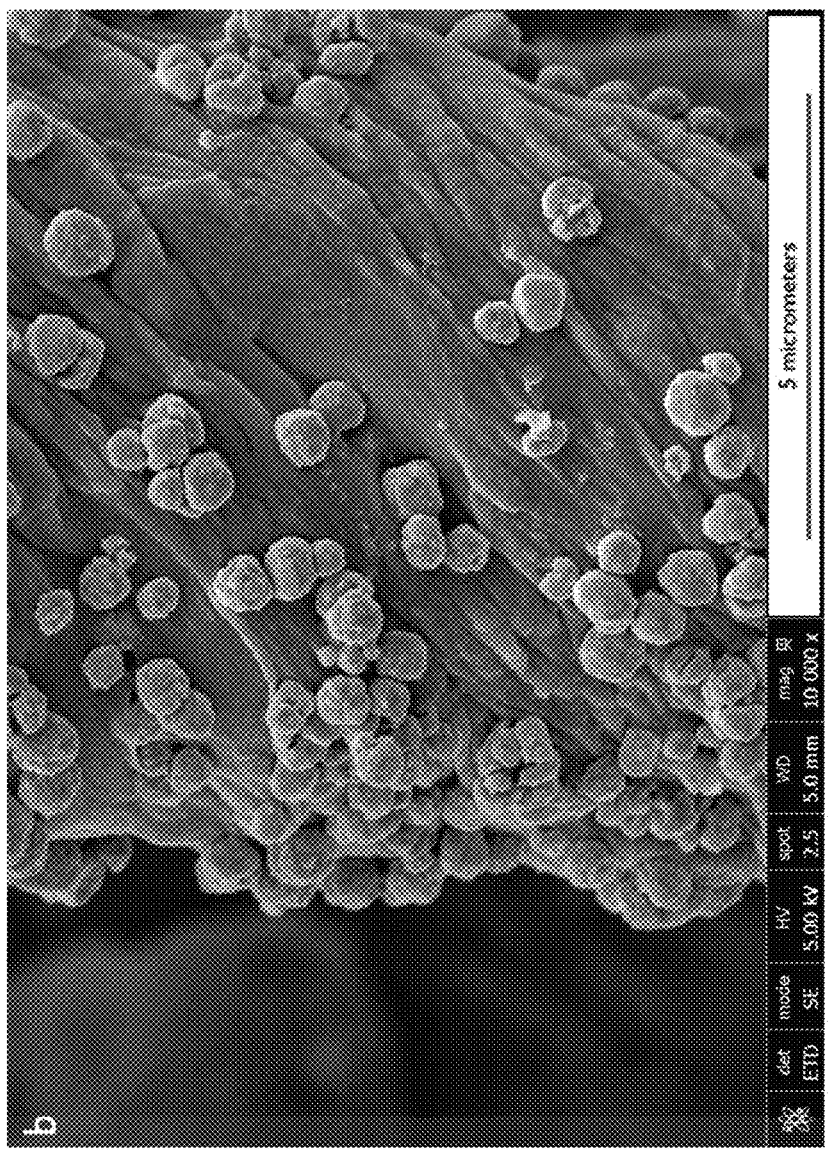
Figure 3C:
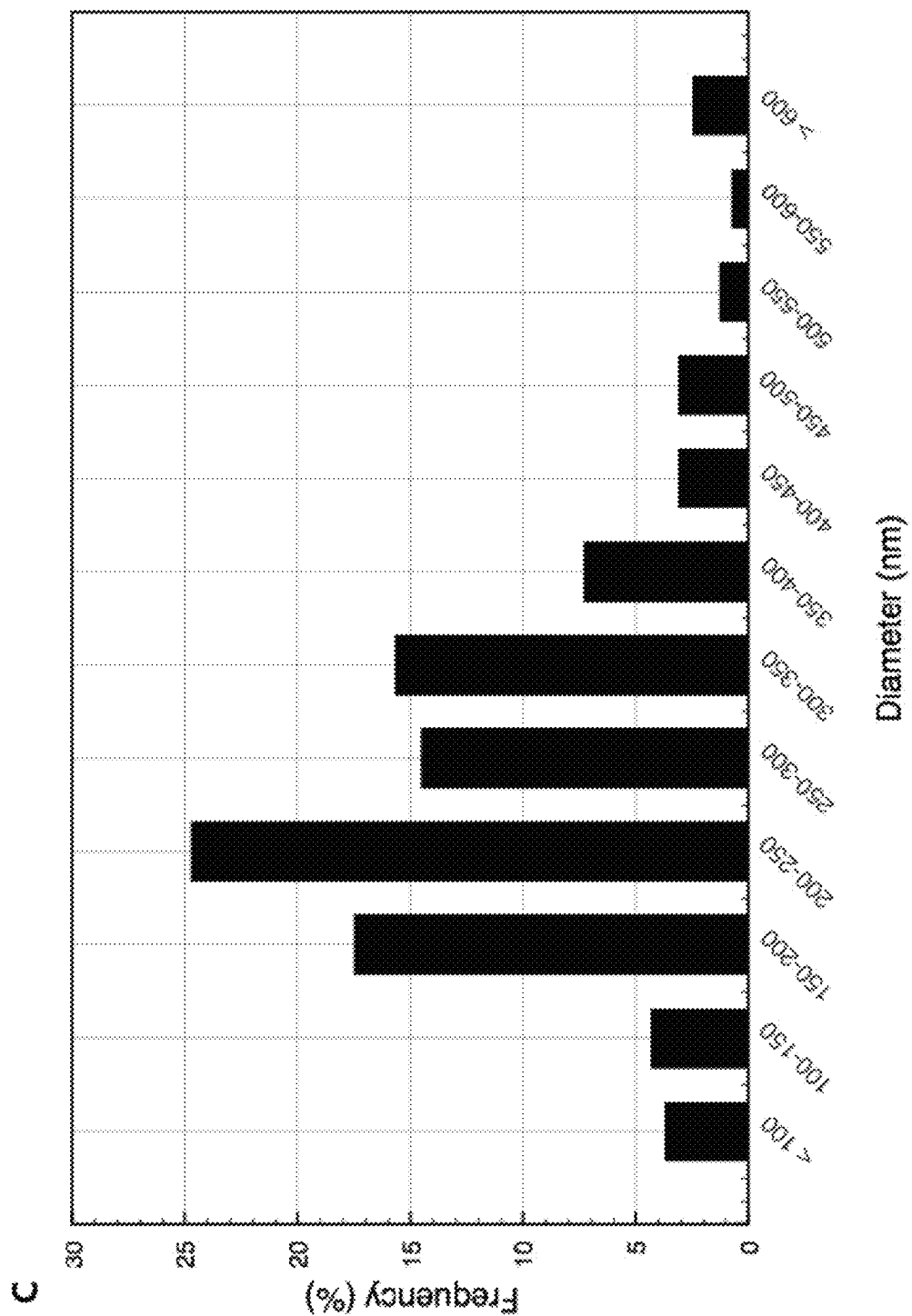
Figure 3D:
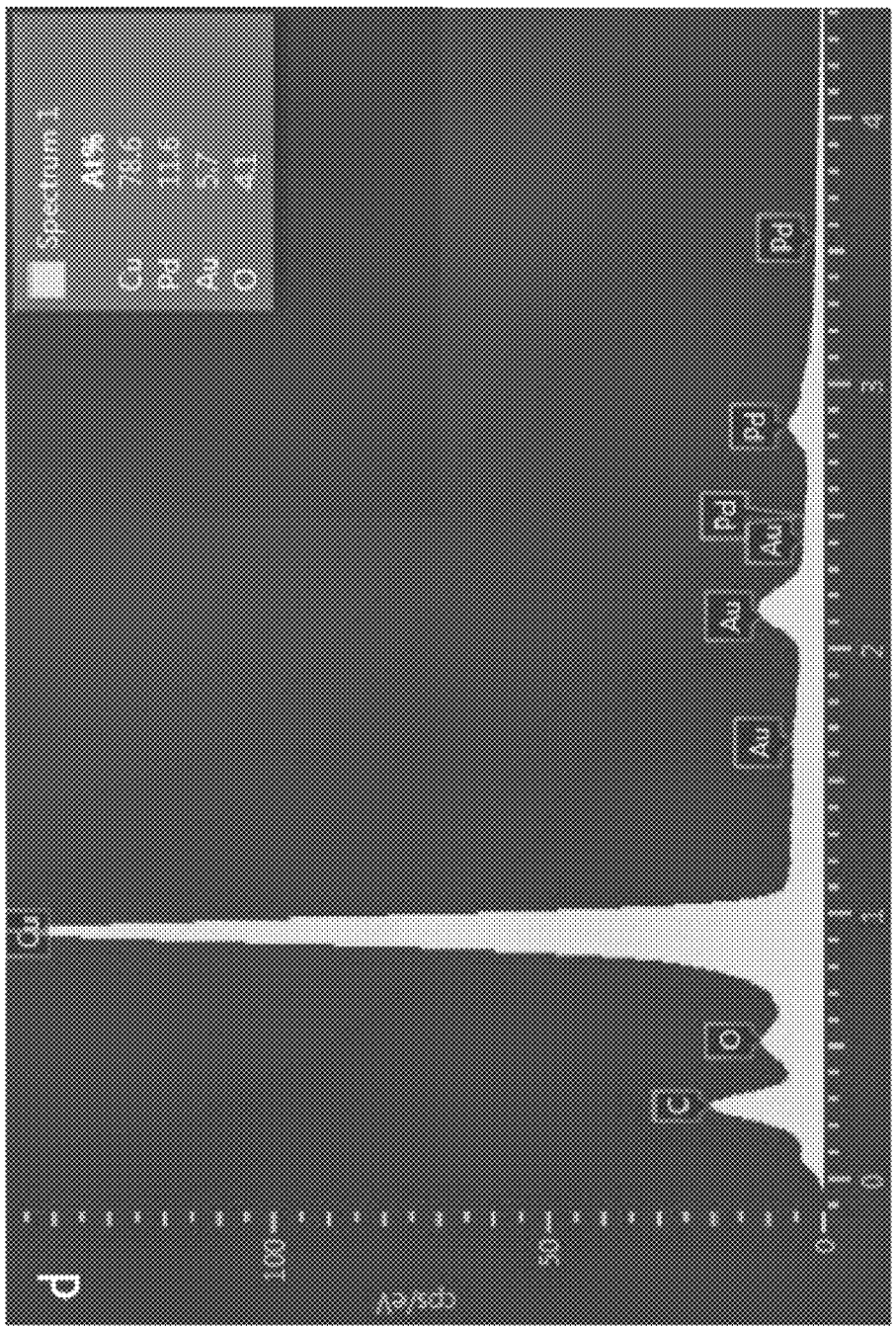

Following the reduction of copper with ascorbic acid on the paper, the surface of the paper fibers was covered with large nanoparticles, as shown in the SEM images (FIG. 3a, b). The size of the copper nanoparticles varied from less than 100 nm to over 600 nm in diameter, with an average diameter of 274.2 nm (FIG. 3c). The larger particles appear to be aggregated smaller particles, and particle size appears to be consistently within this range for all CuNP paper samples. The particle aggregation is likely due to the lack of any stabilizing polymers or ligands in this system. A high intensity EDS peak for copper at 0.93 keV confirmed the formation of copper nanoparticles in the papers, which is consistent with the results obtained from XRD data (FIG. 3d).

Copper uptake from cuprate solutions is time dependent. The sodium hydroxide swelling of cellulose fibers occurs within a few minutes and paper shrinkage is nearly immediately apparent. However, to achieve high levels of copper uptake, the fibers required many hours of soaking in cuprate solutions. In alkaline solution copper ions slowly penetrate the cellulose fiber, and have been suggested to alter the crystalline structure of cellulose (Ogawa et al, 2013). These cellulose copper complexes are stable in basic solutions, but in acidic solutions of ascorbate, copper leaches out of the fibers and is reduced to nanoparticles on the surface of the fibers.

Figure 4:
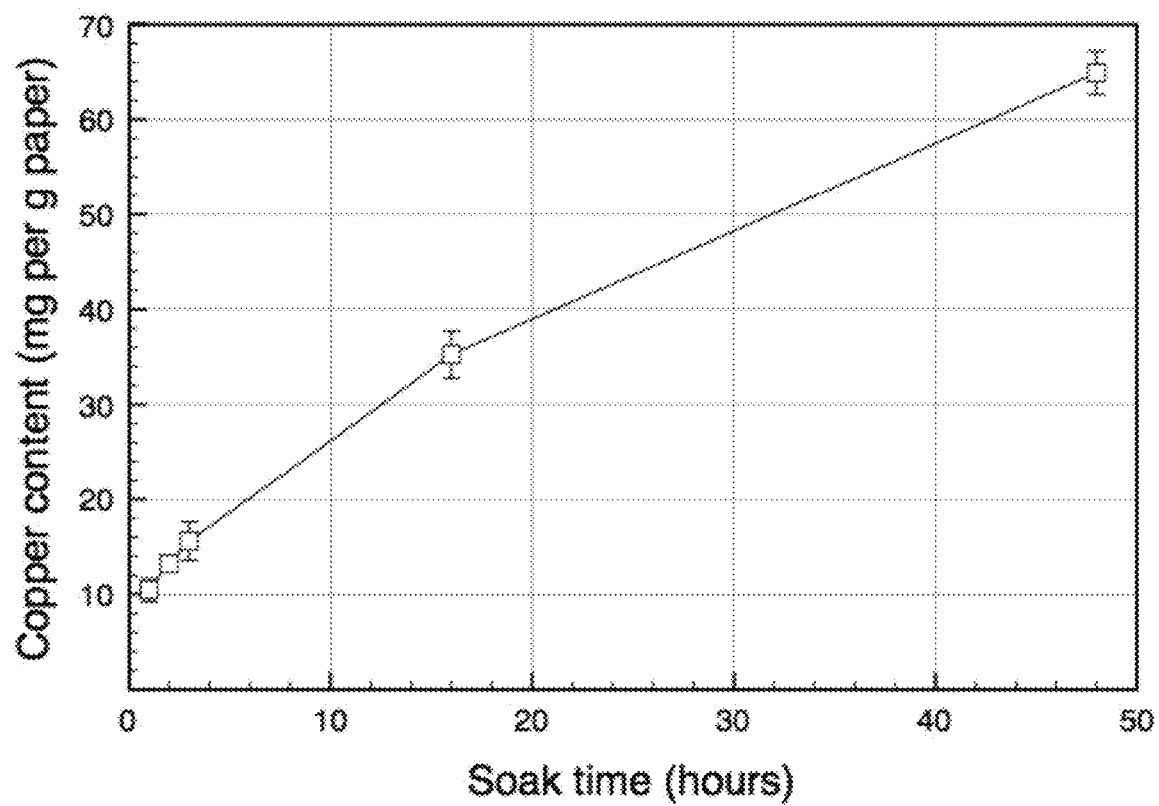
FIG. 4. Copper content in paper filters, measured by flame atomic absorption spectrometry, with increasing paper soak time in cuprate solutions.
Figure 5:
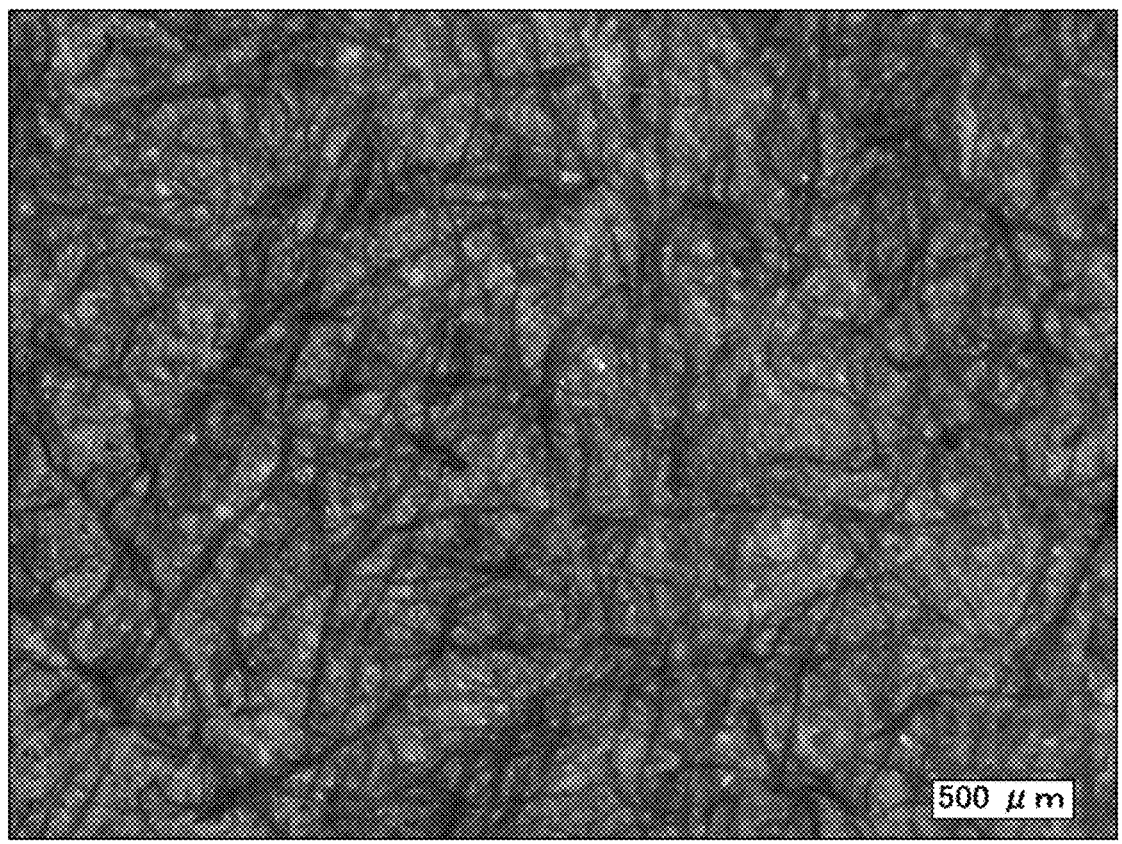
FIG. 5. Dark field microscopy image of CuNP paper. CuNP coated fibers are more concentrated on the outer paper surface (maroon fibers) with uncoated fibers in the paper core (white fibers).

Following nanoparticle synthesis, we performed acid digestions of the CuNP papers to determine the copper content, which ranged from ~10 mg Cu per g paper to 65 mg Cu per g paper for 1 to 48 hours of soak time (FIG. 4). Empirical research has shown copper uptake into cellulosic materials from cuprate solutions to be as high as 225 mg Cu per g of cotton cellulose, which corresponds to 0.57 atoms of Cu per glucose unit and led to the hypothesis that bound copper forms cross-linkages between adjacent cellulose chain molecules (Davidson and Spedding, 1958). From the dark field microscopy imaging, the CuNP papers showed an incomplete coverage of the paper fibers at our highest copper content, the 65 mg Cu per g paper sample (FIG. 5). The paper's outer most fibers have a high degree of copper on the surface, whereas the inner fibers appear white and do not seem to have any copper bound to them. This suggests the copper uptake occurs completely at the outer most surfaces and a thinner paper would allow for a more uniform distribution of CuNPs within the paper.

Antibacterial Effectiveness

Figure 6:
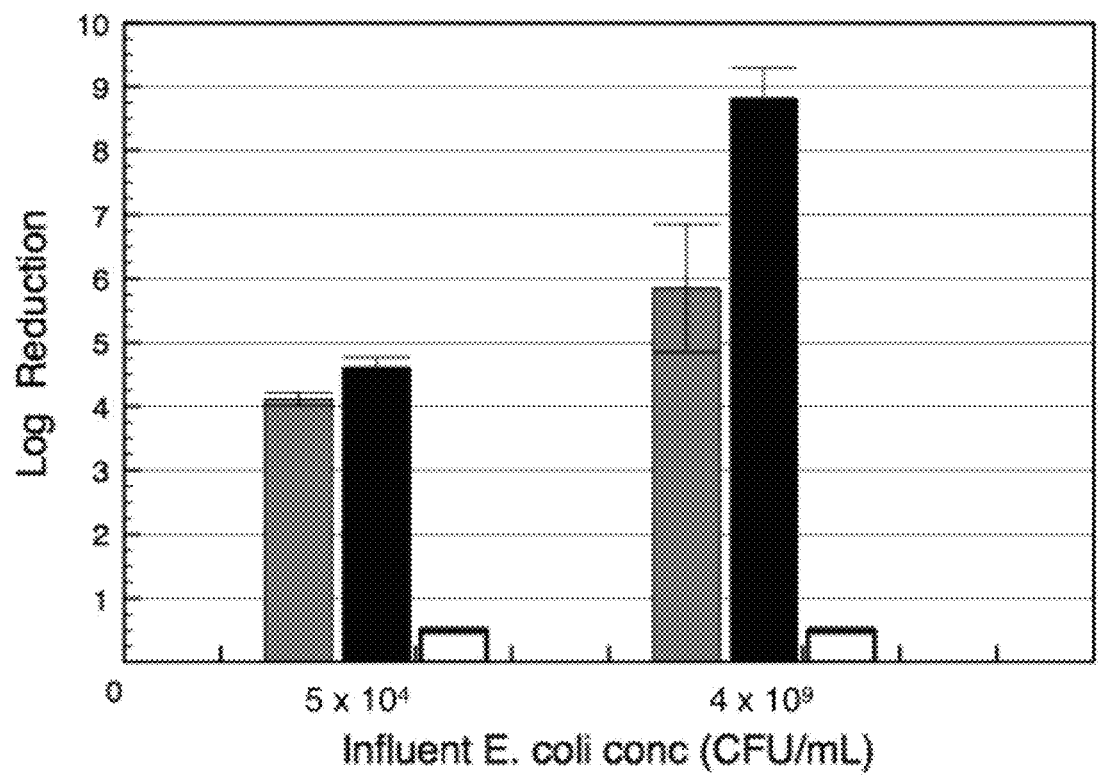
FIG. 6. Log reduction values of *E. coli* bacterial count after permeation through the CuNP paper with 65 mg Cu/g paper (black bars), CuNP paper with 10 mg Cu/g paper (gray bars), and untreated paper (white bars). Two different initial bacterial concentrations were evaluated, $4 \times 10^9$ CFU/mL (log 9.6) and, $5 \times 10^4$ CFU/mL (log 4.7). Standard error is reported.

To assess the bactericidal effectiveness of CuNP papers, we re-grew the effluent bacteria, after passage through the paper. To verify that paper does not filter out bacteria, we also tested for the viable bacteria in the effluent water after filtering through untreated paper. For the 65 mg Cu per g paper CuNP paper, the log reduction value was log 8.8 and log 4.6 reductions of viable $E.$ $coli$ bacteria, in the effluent, as compared to the initial concentration of bacteria ($4.4\times10^9$ CFU/mL and $5.2\times10^4$ CFU/mL) (FIG. 6). The CuNP paper with lower copper content (10 mg Cu per g paper) showed a lesser degree of bacterial inactivation. The untreated paper showed a minor filtration effect with a log reduction of 0.5. These results are similar to our previous study of AgNP paper filtration of $E.$ $coli$ bacteria (Dankovich and Gray, 2011a). The average flow rate of bacterial suspensions through the CuNP was 1.81 liters per hour, which is three times as fast as flow through our previous AgNP papers (Dankovich and Gray, 2011a). In contrast, the flow rate of the untreated filter papers was much slower, only filtering at 0.3 liters per hour. Swelling from the NaOH soaking step causes the increase in paper thickness and air to be trapped in the swollen sheet, and as a result, a greater inter fiber pore space of the filter paper (Richter and Glidden, 1940).

Figure 7:
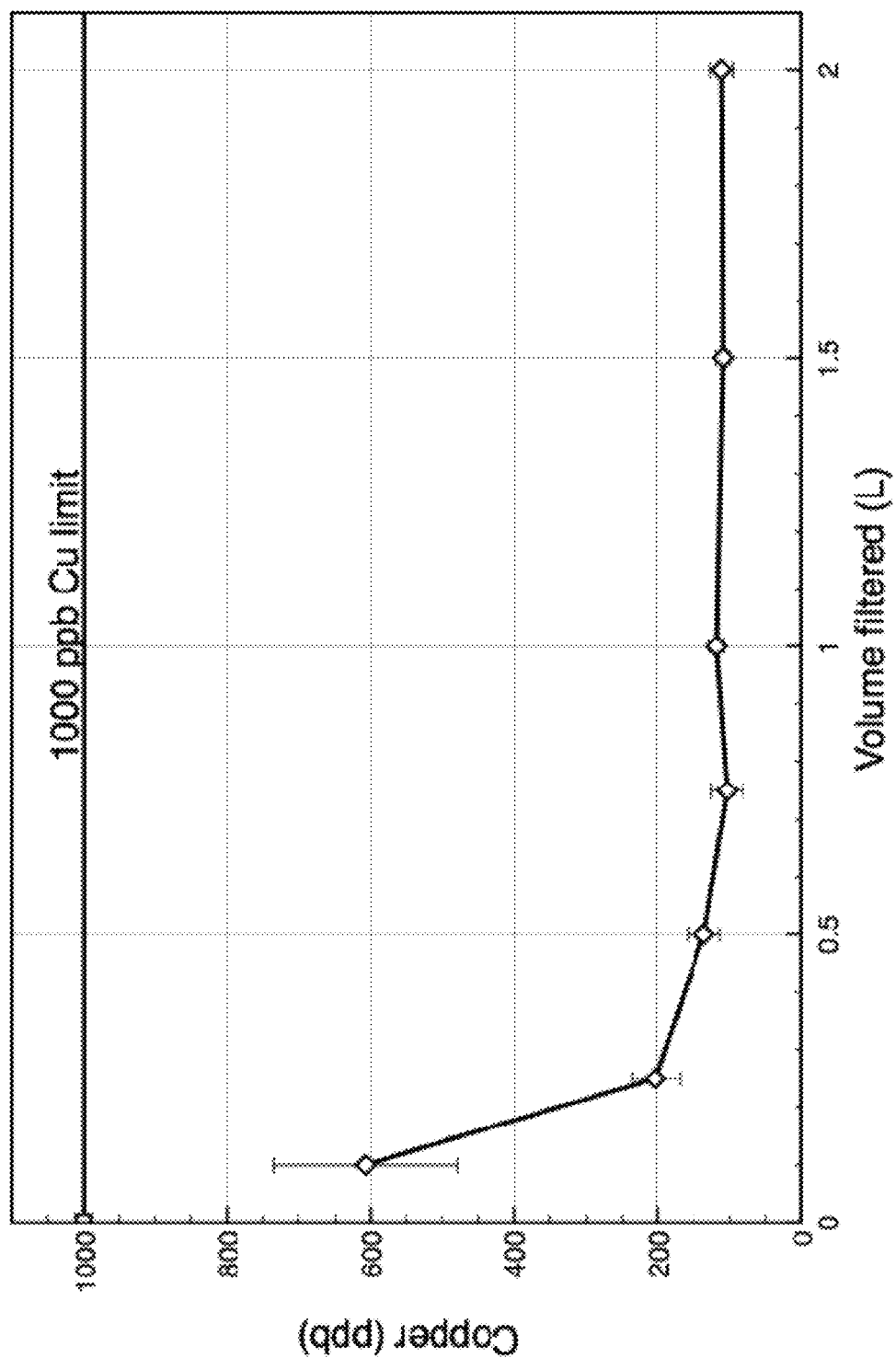
FIG. 7. Copper concentration in effluent water with respect to volume of water filtered through the CuNP paper. The recommended Cu limit for drinking water is 1000 ppb.

Copper in an essential trace element for human health, but ingesting levels higher than 3 ppm in drinking water for two weeks can cause gastrointestinal irritation (Agency for Toxic Substances & Disease Registry, 2004). The average copper concentration in the filter effluent was 206.9±34.1 ppb (FIG. 7) from filtering deionized water through the 65 mg Cu per g paper sample, which is well below the EPA secondary limit for copper in drinking water (1000 ppb) (US EPA, 2002). Because the antibacterial tests were conducted after filtering 100 mL of bacterial suspensions, the expected copper concentration in the effluent during the bactericidal tests should be between 200-600 ppb. Because the graphite furnace atomic absorption spectrometer does not distinguish between the specific forms of the analyte, there is no information from this method on whether the copper released is in the nanoparticle or ionic form. Dissolved carbon dioxide and oxygen from the atmosphere are present in the deionized water, which causes surface corrosion of the copper nanoparticles, and as a result, the surface layer of the nanoparticles to be in the ionic form and this is supported by the copper oxide XRD peak (FIG. 2). It has been observed in similar systems that the corroded copper readily releases dissolved copper ions (Dortwegt and Maughan, 2001), and as is likely in this case as well. The copper release from the CuNP paper was 0.14% of the initial copper content of the filter papers per liter of water filtered. The very low copper release per liter suggests the CuNP paper could be a long-lasting water purifier.

Figure 8A:
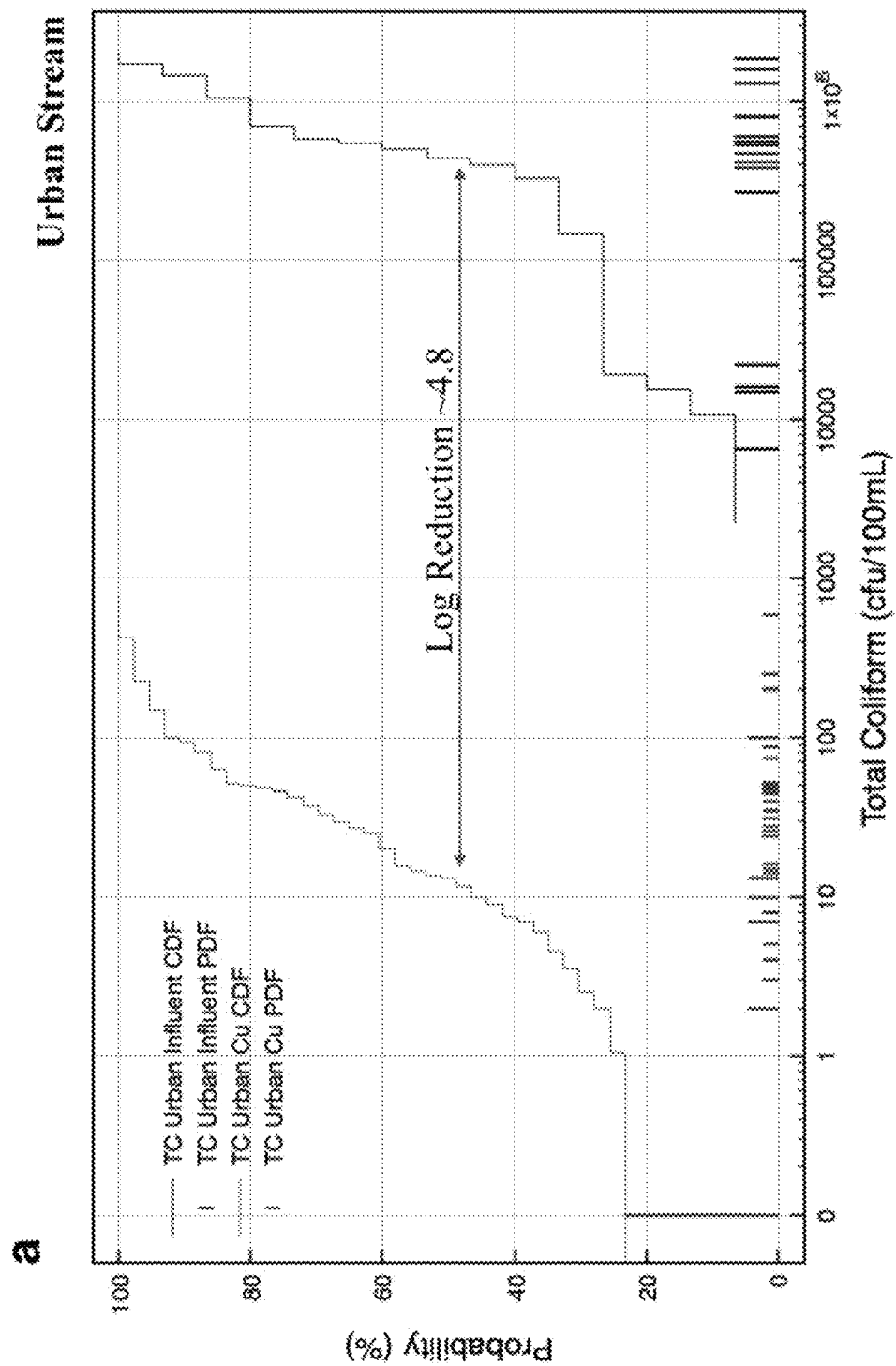
FIG. 8. Cumulative and probability distribution functions of total coliform counts for the urban stream (A) and rural stream (B) water samples from Limpopo, South Africa, with the influent samples (black and purple lines, and teal and black bars), and the water samples filtered through the copper nanoparticle papers (red and orange lines and bars). Logarithmic reduction values of total coliform bacteria are approximated by the difference between the influent and filtered cumulative distribution functions.
Figure 8B:
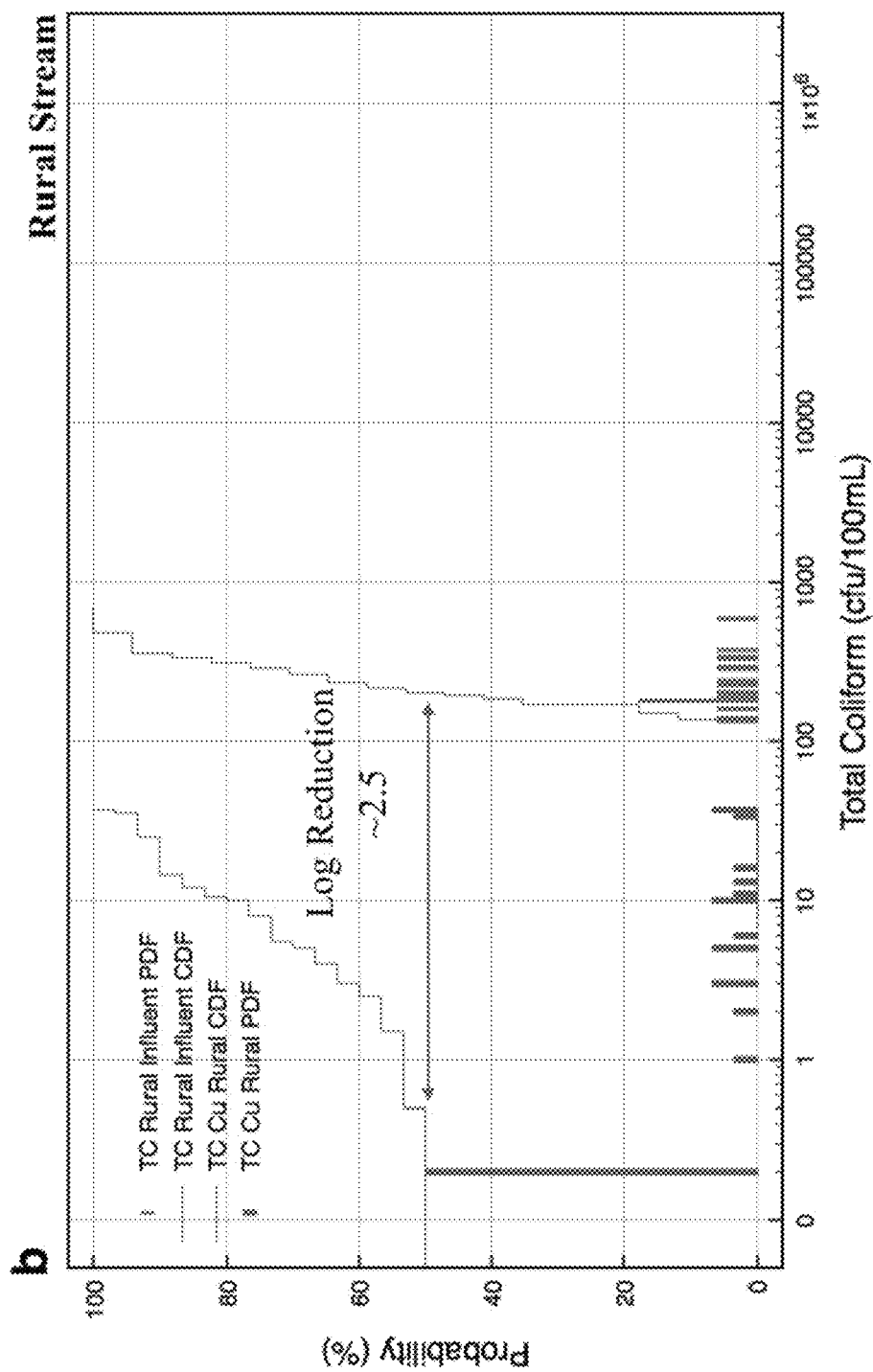
Figure 9A:
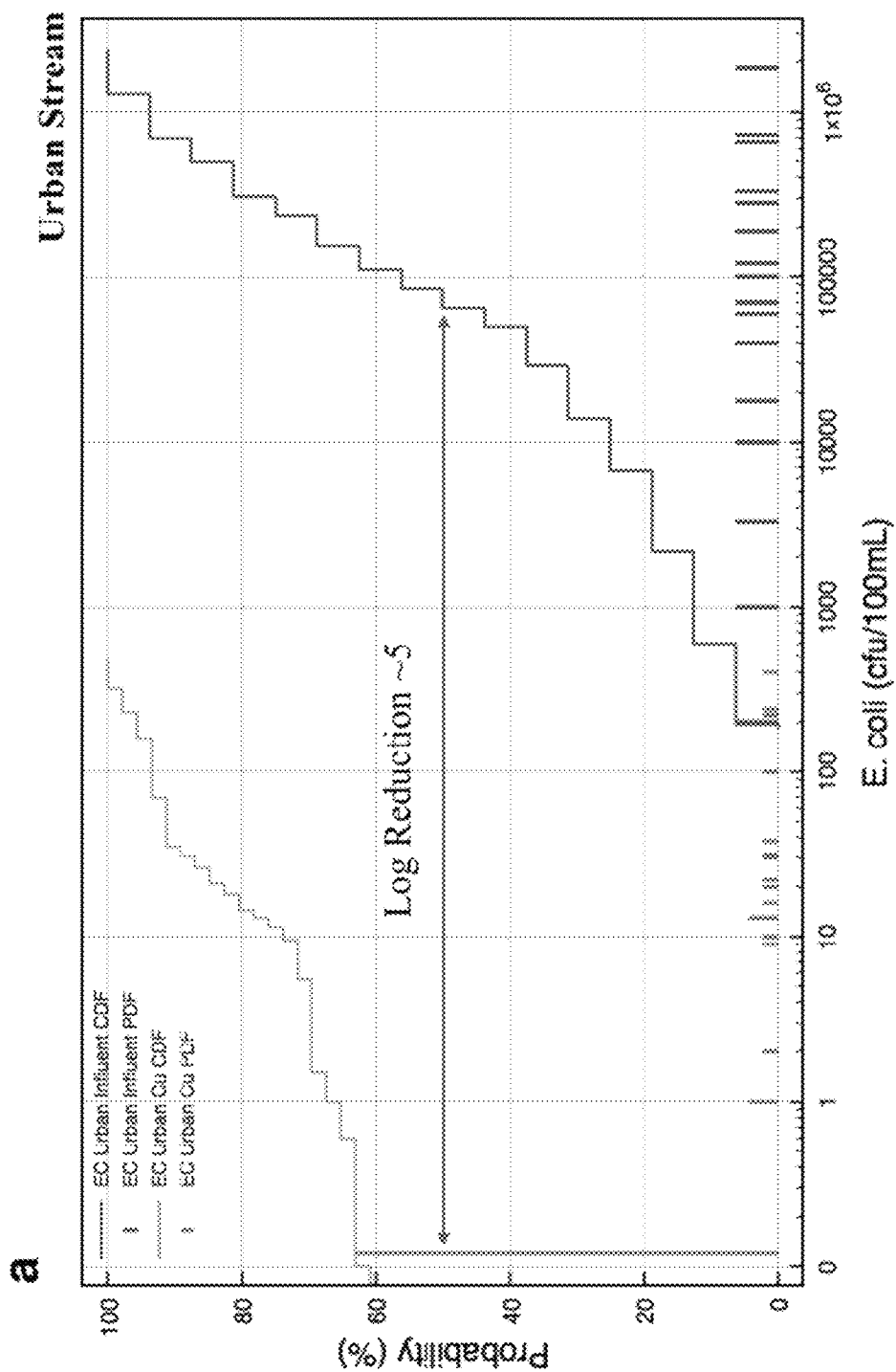
FIG. 9. Cumulative and probability distribution functions of *E. coli* counts for the urban stream (A) and rural stream (B) water samples from Limpopo, South Africa, with the influent samples (black and purple lines, and teal and black bars), and the water samples filtered through the copper nanoparticle papers (red and orange lines and bars). Logarithmic reduction values of *E. coli* bacteria are approximated by the difference between the influent and filtered cumulative distribution functions.
Figure 9B:
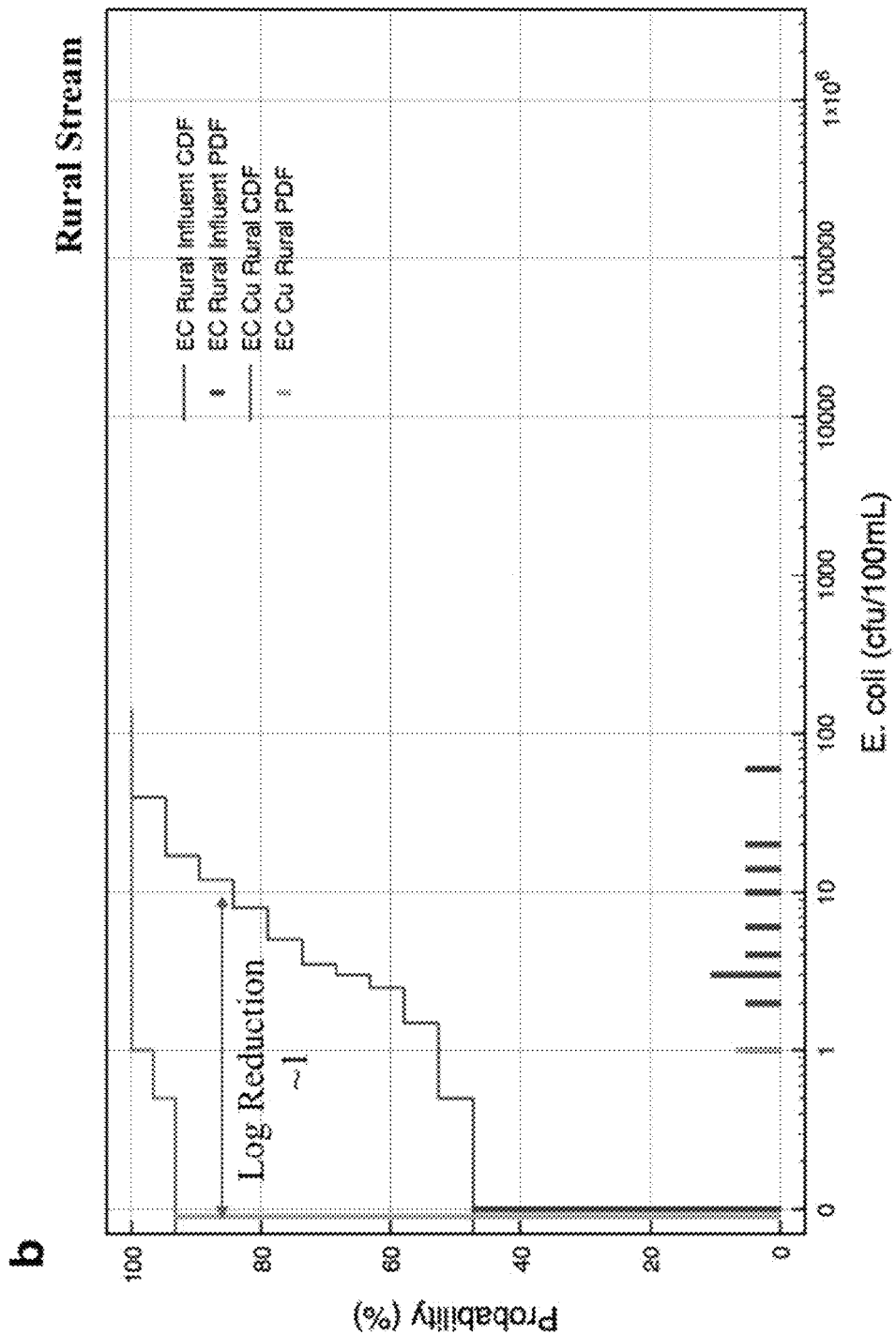
Figure 10A:
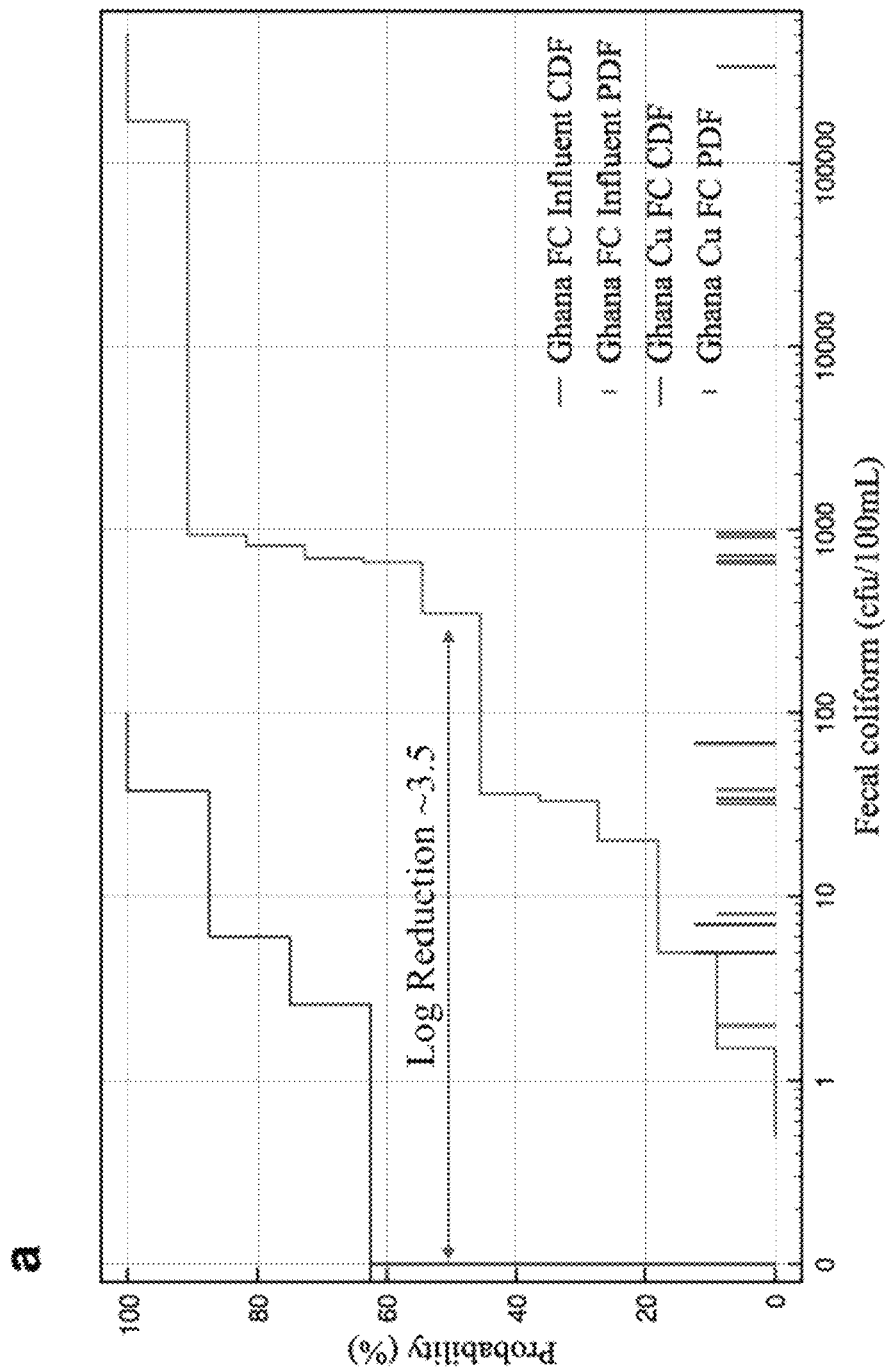
FIG. 10. Cumulative and probability distribution functions of fecal coliform (top) and *E. coli* (bottom) counts for water samples from Northern Ghana, with the influent samples (blue and teal lines and bars), and the water samples filtered through the copper nanoparticle papers (red and orange lines and bars). Logarithmic reduction values of both fecal coliform (A) and *E. coli* (B) bacteria are approximated by the difference between the influent and filtered cumulative distribution functions.
Figure 10B:
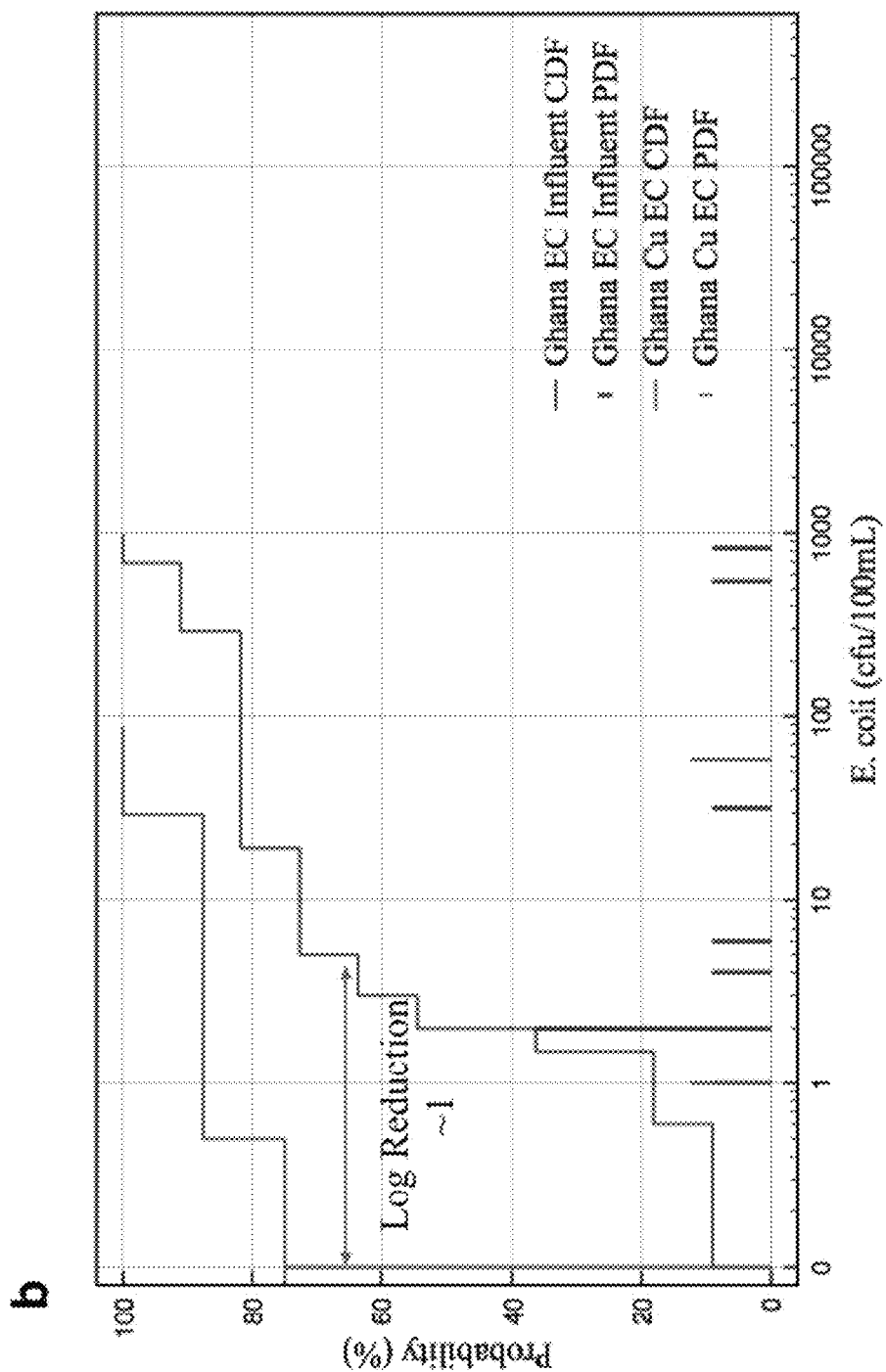

It can also be seen in FIG. 8 the cumulative and probability distribution functions of total coliform counts for the urban stream (A) and rural stream (B) water samples from Limpopo, South Africa. FIG. 9 provides cumulative and probability distribution functions of $E.$ $coli$ counts for the urban stream (A) and rural stream (B) water samples from Limpopo, South Africa. FIG. 10 provides cumulative and probability distribution functions of fecal coliform (top) and $E.$ $coli$ (bottom) counts for water samples from Northern Ghana.

Discussion

Without wishing to be bound by any particular theory, it is hypothesized herein that the mechanism of this CuNP paper is that $E.$ $coli$ bacteria accumulate copper ions from direct contact with CuNPs in the paper, and over time become inactivated. Since the IDEXX method requires 24 hours to analyze for bacteria viability, it is not possible to know exactly how long copper takes to inactivate bacteria from our study. However, from other studies, it appears copper ions can rapidly inactivate bacteria from a few minutes (Esperito Santo et al, 2011; Molteni et al, 2010; Jia et al, 2012) to several hours (Varkey and Dlamini, 2012), depending upon the environmental conditions. In this particular study, we cannot conclude whether dissolved copper or copper absorbed by the bacterial cells contributes to bacterial inactivation, but in subsequent work, which is published elsewhere (Dankovich et al, 2015), we used another method to test for bacterial viability, i.e. membrane filtration, which separates the effluent water from the bacteria cells immediately following filtration through the CuNP paper. This work also showed strong antibacterial activity of the CuNP papers, which supports the idea that bacterial inactivation is due to the direct contact with CuNPs during filtration through the CuNP paper (Dankovich et al, 2015). Other researchers have examined the specific mechanism of copper inactivation of bacteria and suggest that the copper ions cause irreversible damage to bacterial membranes by increasing membrane permeability and destabilizing the cells (Esperito Santo et al, 2011).

This study is a proof-of-concept example of water purification using papers embedded with copper nanoparticles, and other variables not tested in this work also can affect the overall bactericidal performance of these filter papers. For example, the particle retention size of cellulosic filter papers can be altered in the paper making process to fit the particular filtration application. The fiber arrangement and density will dictate the overall flow rate through the paper sheet. Environmental variables, such as turbidity in water sources, will lead to determining an optimal filter paper. High turbidity leads to clogged filters, which could be avoided if the particle retention of the paper is large enough to allow adequate flow through. Possibly, the final version may contain some mix of untreated paper (or other material) to remove turbidity and the CuNP paper to reduce bacteria count.

These CuNP paper filters fit into the greater picture of point-of-use water filtration on the very low cost end. The amount of copper in each paper amounts to less than a cent, and could be easily incorporated with other existing POU methods. Ongoing research is exploring various filter designs to add these antibacterial papers to. Potential uses include disaster relief and emergency response, backpacking filters, and rural household filters for developing countries. In our subsequent work, we have evaluated longer term use for this filter papers, which shows the potential for repeat usage with natural water sources (Dankovich et al, 2015). Future work will clarify the extent to how much water a single paper filter can purify. Performance limitations may be due to either the amount of CuNPs in the paper or the overall strength of the paper filter. In the current state, this proof of concept experiment of an antibacterial paper containing CuNPs shows the potential to be a very useful filter, but the filter design needs to be optimized prior to the evaluation of the relevant water purification metrics, such as antiviral, anti-protozoan, and long term antimicrobial performance.

With some of the papers containing high levels of copper nanoparticles, we observed slow wetting of the papers. Cellulosic materials and in particular blotting papers are hydrophilic materials and highly water absorbent (Dankovich and Gray, 2011b). We did not observe reduced hydrophilicity with the filters we tested in the study, which were all highly wettable and allowed water to flow through at rates even faster than the untreated papers. It is relevant to note that there is an upper limit to the amount of copper that can be added to this filter paper and other filtration materials. A hydrophobic water filter cannot filter water, and therefore, for water filtration applications it is not advisable to use copper levels higher than the 7% weight percent, which was our upper limit. However, the filter paper comprising copper as prepared herein can in some cases be used by merely soaking the paper in a sample of water to release the copper into that sample and act as an antimicrobial. Although, other potential uses of a hydrophobic copper nanoparticle embedded paper may not rely on wettability. For example, another application of nano-copper materials is to impart superhydrophobic surfaces, such as with ceramic coatings (Reinosa et al., 2012).

Table 1 provides a summary of field studies testing copper nanoparticle paper for point-of-use water purification in South Africa and Ghana.

TABLE 1

Microbiological water quality data from water sources in Limpopo, South Africa, mean (95% CI*).

| | Urban stream— High | Urban stream— Moderate | Rural Irrigation Canal |
|---|---|---|---|
| | Total Coliform (CFU/100 mL) | | |
| Untreated water | 800,000 (500,000-1,000,000) | 11,000 (7,300-15,000) | 250 (195-300) |
| Control Paper Thin | 110,000 (50,000-175,000) | — | 18 (0-46) |
| Control Paper Thick | 640,000** | — | 60 (50-70) |
| CuNP Thin | 40 (0-80) | 18 (6-26) | 7 (3-11) |
| | E. coli (CFU/100 mL) | | |
| Untreated water | 375,000 (85,000-665,000) | 5,000 (100-10,000) | 13 (8-16) |

TABLE 1-continued

Microbiological water quality data from water sources in Limpopo, South Africa, mean (95% CI*).

| | Urban stream— High | Urban stream— Moderate | Rural Irrigation Canal |
|---|---|---|---|
| Control Paper Thin | 28,000 (2,400-53,000) | — | 2 (0-2) |
| Control Paper Thick | 310,000** | — | 5 (1-8) |
| CuNP Thin | 70 (0-140) | 6 (0-9) | 0 |

*95% confidence intervals
**Only one sample evaluated.

Conclusion

Although many studies have shown the antimicrobial effects of copper surfaces in hospitals, the use of copper in drinking water treatment, has been limited to silver-copper ionization systems for the control of Legionnaire's disease and copper pots in developing countries. A sheet of CuNP paper as disclosed herein can be synthesized in the laboratory for a material cost of only a few cents per filter. If these filters can continue to perform for tens to hundreds of liters of clean water, then this CuNP paper filter represents an extremely low-cost way to purify water. This is especially relevant for resource limited countries, and can be used in remote "off-the-grid" locations.

The disclosures of each and every patent, patent application, and publication cited herein are hereby incorporated by reference herein in their entirety. Other useful methods can be found in international patent application WO 2014071346 (PCT/US2013/068409).

Headings are included herein for reference and to aid in locating certain sections. These headings are not intended to limit the scope of the concepts described therein under, and these concepts may have applicability in other sections throughout the entire specification.

While this invention has been disclosed with reference to specific embodiments, it is apparent that other embodiments and variations of this invention may be devised by others skilled in the art without departing from the true spirit and scope of the invention.

BIBLIOGRAPHY

Agency for Toxic Substances & Disease Registry, Division of Toxicology, Public health statement on Copper, 2004.

Ben-Sasson, M., Zodrow, K. R., Genggeng, Q., Kang, Y., Giannelis, E. P., Elimelech, M., 2013. Surface Functionalization of Thin-Film Composite Membranes with Copper Nanoparticles for Antimicrobial Surface Properties. Environ. Sci. Technol. DOI: 10.1021/es404232s.

Bendi, R., Imae, T., 2013. Renewable catalyst with Cu nanoparticles embedded into cellulose nano-fiber film. RSC Advances 3, 16279-16282.

Borkow, G., Sidwell, R. W., Smee, D. F., Barnard, D. L., Morrey, J. D., Lara-Villega, H. H., Shemer-Avni, Y., Gabbay, J., 2007. Neutralizing Viruses in Suspensions by Copper Oxide-Based Filters. Antimicrobial Agents Chemotherapy. 51(7), 2605-2607.

Cady, N., Behnke, J., Strickland, A., 2011. Copper-Based Nanostructured Coatings on Natural Cellulose: Nanocomposites Exhibiting Rapid and Efficient Inhibition of a Multi-Drug Resistant Wound Pathogen, *A. baumannii*, and Mammalian Cell Biocompatibility In Vitro. Adv. Funct. Mater. 21(13), 2506-2514.

Clasen, T., 2010. Household Water Treatment and the Millennium Development Goals: Keeping the Focus on Health. Environ. Sci. Technol. 44(19), 7357-7360.

Dankovich, T. A. et al., 2015. Inactivation of bacteria from contaminated streams in Limpopo, South Africa by silver- or copper-nanoparticle paper filters. Under review at ES: Water Research and Technology.

Dankovich, T. A., Gray, D. G., 2011a. Bactericidal Paper Impregnated with Silver Nanoparticles for Point-of-Use Water Treatment. Environ. Sci. Technol. 45(5), 1992-1998.

Dankovich, T. A., Gray, D. G., 2011b. Contact Angle Measurements on Smooth Nanocrystalline Cellulose (I) Thin Films. J Adhesion Sci. Technol. 25(6-7), 699-708.

Davidson, G. F., Spedding, H., 1958. The absorption of copper by cotton cellulose from sodium cuprate solutions. The Normann compound. J Textile Institute Transactions 49(11), T621-T626.

Dortwegt, R., Maughan, E. V., 2001. The chemistry of copper in water and related studies planned at the Advanced Photon Source. Proceedings of the 2001 Particle Accelerator Conference, Chicago. 2, 1456-1458.

Edberg, S. C., Allen, M. J., Smith, D. B., Kriz, N. J. 1990. Enumeration of Total Coliforms and *Escherichia coli* from Source Water by Defined Substrate Technology. Appl and Environ Microbiology. 56(2), 366-369.

Esperito Santo, C., Lam, E. W., Elowsky, C. G., Quaranta, D., Domaille, D. W., Change, C. J., Grass, G., 2011. Bacterial Killing by Dry Metallic Copper Surfaces. Appl. Environ. Microbiol. 77(3), 794-802.

Jia, B., Mei, Y., Cheng, L., Zhou, J., Zhang, L., 2012, Preparation of copper nanoparticles coated cellulose films with antibacterial properties through one-step reduction. ACS Appl. Mater. & Interfaces. 4(6), 2897-2902.

Klein, T. Y., Wehling, J., Treccani, L., Rezwan, K., 2013. Effective Bacterial Inactivation and Removal of Copper by Porous Ceramics with High Surface Area. Environ. Sci. Technol. 47(2), 1065-1072.

Molteni, C., Abicht, H. K., Solioz, M., 2010. Killing of Bacteria by Copper Surfaces Involves Dissolved Copper. Appl. Environ. Microbiol. 76(12), 4099-4101.

Ogawa, Y., Hidaka, H., Kimura, S., Kim, U.-J., Kuga, S., Wada, M., 2013. Formation and stability of cellulose-copper-NaOH crystalline complex. Cellulose DOI: 10.1007/s10570-013-9977-4.

Reinosa, J. J., Romero, J. J., Jaquotot, P., Bengochea, M. A., Fernandez, J. F., 2012. Copper based hydrophobic ceramic nanocoating. J European Ceramic Society 32(2), 277-282.

Richter, G. A., Glidden, K. E., 1940. Cellulose sheet swelling. Ind. Eng. Chem. 32(4), 480-486.

Stout, J. E., Yu, V. L., 2003. Experiences of the First 16 Hospitals Using Copper-Silver Ionization for Legionella Control: Implications for the Evaluation of Other Disinfection Modalities. Infect. Control Hosp. Epidemiol. 24(8), 563-568.

Sudha, V. B. P., Ganesan, S., Pazhani, G. P., Ramamurthy, T., Nair, G. B., Venkatasubramanian, P., 2012. Storing drinking-water in copper pots kills contaminating diarrhoeagenic bacteria. J Health Popul. Nutr. 30(1), 17-21.

US EPA, 2002. Title 40: Protection of the Environment. 143.3.

Vainio, U., Pirkkalainen, K., Kisko, K., Goerigk, G., Kotelnikova, N. E., Serimaa, R., 2007. Copper and copper oxide nanoparticles in a cellulose support studied using anomalous small-angle X-ray scattering, Eur. Phys. J D. 42(1), 93-101.

Varkey, A. J., Dlamini, M. D, 2012. Point-of-use water purification using clay pot water filters and copper mesh. Water SA. 38(5), 721-726.

Langdo et al., (PCT/US2012/069852, filed Dec. 14, 2012).

Smith et al. (Int. Pat. Pub. No. WO 2014/071346, published May 8, 2014; PCT/US2013/068409).

What is claimed is:

1. A method of preparing a point-of-use water purification system comprising copper-containing paper, the method comprising:

contacting an absorbent cellulose blotting paper or filter paper with an alkaline solution of copper hydroxide and soaking the paper in said solution, wherein copper is sorbed onto the paper;

wherein the alkaline copper hydroxide solution is prepared by adding 1 M NaOH to a 0.32 M $CuSO_4$ solution to form gelatinous copper hydroxide (Cu$(OH)_2$) and dissolving the gelatinous Cu$(OH)_2$ in 500 ml of 10 M NaOH to form $[Cu(OH)_4]^{2-}$, thereby preparing the alkaline copper hydroxide solution;

removing the paper from the copper hydroxide solution and then contacting the paper with deionized water to remove excess base;

following removing the excess base, reducing copper ions embedded in the paper by contacting the paper with an ascorbic acid solution;

removing the paper from ascorbic acid solution; and washing the paper with deionized water, thereby preparing the point-of-use water purification system.

2. The method of claim 1, wherein the paper comprises bleached softwood kraft pulp and a thickness of about 0.1 millimeters (mm) to about 3.0 mm and a grammage of about 10 g/meter$^2$ (m$^2$) to about 1,000 g/m$^2$.

3. The method of claim 2, wherein the paper has a thickness of about 0.5 mm.

4. The method of claim 1, wherein the paper has a grammage of about 250 g/m$^2$.

5. The method of claim 1, wherein the paper is contacted with the solution of alkaline copper hydroxide for a range of time selected from about 0.5 hours to about 3 days.

6. The method of claim 5, wherein the paper is contacted with the solution of alkaline copper hydroxide for a range of time from about 1 hour to about 2 days.

7. The method of claim 1, wherein the sorbed copper forms copper nanoparticles on the paper.

8. The method of claim 7, wherein the sorbed copper forms copper nanoparticles on the paper in less than about 1 hour.

9. The method of claim 8, wherein the sorbed copper forms copper nanoparticles on the paper in less than about 10 minutes.

10. The method of claim 1, wherein the ascorbic acid solution is a 10% ascorbic acid solution.

11. The method of claim 1, wherein the paper is contacted with the ascorbic acid solution at about 85° C. for about 10 to about 30 minutes.

12. The method of claim 1, wherein following washing the paper with deionized water the paper comprises a range of about 1 milligram (mg) sorbed Cu/gram (g) paper to about 500 mg sorbed Cu/g paper.

13. The method of claim 12, wherein the paper comprises a range of about 5 mg sorbed Cu/g paper to about 250 mg sorbed Cu/g paper.

14. The method of claim 13, wherein the paper comprises a range of about 10 mg sorbed Cu/g paper to about 100 mg sorbed Cu/g paper.

15. The method of claim 14, wherein the paper comprises a range of about 15 mg sorbed Cu/g paper to about 65 mg sorbed Cu/g paper.

16. The method of claim 1, wherein the system has antimicrobial activity when contacted with water comprising microorganisms.

17. The method of claim 16, wherein the microorganisms are bacteria.

18. The method of claim 17, wherein the bacteria are coliform bacteria.

19. The method of claim 18, wherein the bacteria are *Escherichia coli* (*E. coli*).

20. The method of claim 1, wherein following reduction the paper is soaked overnight in deionized water.

21. A method of purifying a sample of water, the method comprising contacting a sample of water with a point-of-use water purification system prepared by the method of claim 1.

22. The method of claim 21, wherein the sample of water is filtered through the system.

23. The method of claim 22, wherein said method removes or inactivates microorganisms in the water.

24. The method of claim 23, wherein the microorganisms are bacteria.

25. The method of claim 24, wherein the paper comprising sorbed copper reduces bacteria by a log of about 1 to about 10.

26. The method of claim 24, wherein the bacteria are coliform bacteria.

27. The method of claim 26, wherein the bacteria are *E. coli*.

28. The method of claim 21, wherein when a sample of water is filtered through the point-of-use water purification system, copper is released into the water at a concentration less than about 10 parts per million.

29. The method of claim 28, wherein the copper is released into the water at a concentration less than about 5 parts per million.

30. The method of claim 29, wherein the copper is released into the water at a concentration less than about 1 part per million.

31. The method of claim 30, wherein the copper is released into the water at a concentration less than about 0.2 parts per million.

32. The method of claim 21, wherein the flow rate of the water through the paper is from about 0.5 to about 50 L/hr.

33. The method of claim 32, wherein the flow rate of the water through the paper is from about 1.0 to about 2.0 L/hr.

34. The method of claim 33, wherein the flow rate of the water through the paper is about 1.81 L/hr.

35. A method of preparing a point-of-use water purification system comprising copper-containing paper, the method comprising:

contacting an absorbent cellulose blotting paper or filter paper with a solution of 0.8% alkaline copper hydroxide and soaking the paper in said solution for about 1 hour to about 2 days, wherein copper is sorbed onto the paper, and wherein the alkaline copper hydroxide solution is prepared by adding 1M NaOH to a 0.32 M $CuSO_4$ solution to form a gelatinous copper hydroxide $Cu(OH)_2$) and dissolving the gelatinous $Cu(OH)_2$ in 500 ml of 10 M NaOH to form $[Cu(OH)_4]^{2-}$;

removing the paper from the copper hydroxide solution and then contacting the paper with deionized water to remove excess base;

following removing the excess base, reducing copper ions embedded in the paper by contacting the paper with a 10% ascorbic acid solution at about 85° C. for about 10 to about 30 minutes so that sorbed copper forms nanoparticles on the paper in less than 1 hour;

removing the paper from ascorbic acid solution; and washing the paper with deionized water, thereby preparing the point-of-use water purification system wherein the paper comprises bleached softwood kraft pulp and a thickness of about 0.5 millimeters (mm) and a grammage of about 250 $g/m^2$, the and a range of about 15 mg sorbed Cu/g paper to about 65 mg sorbed Cu/g paper.

36. A method of purifying a sample of water, the method comprising contacting a sample of water with a point-of-use water purification system prepared by the method of claim 35.

* * * * *